US012412536B2

(12) United States Patent
Lim et al.

(10) Patent No.: US 12,412,536 B2
(45) Date of Patent: Sep. 9, 2025

(54) ELECTRONIC DEVICE INCLUDING A DISPLAY DEVICE FOR NOT TRANSMITTING IMAGE DATA DURING PERIODS HAVING SAME DATA AND METHOD THEREOF

(71) Applicant: SAMSUNG DISPLAY CO., LTD., Yongin-si (KR)

(72) Inventors: Hyunho Lim, Hwaseong-si (KR); Myeongbin Lim, Hwaseong-si (KR); Hyunha Yang, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/623,131

(22) Filed: Apr. 1, 2024

(65) Prior Publication Data

US 2024/0249688 A1 Jul. 25, 2024

Related U.S. Application Data

(63) Continuation of application No. 17/862,507, filed on Jul. 12, 2022, now Pat. No. 11,948,514.

(30) Foreign Application Priority Data

Sep. 16, 2021 (KR) ........................ 10-2021-0124040

(51) Int. Cl.
*G09G 3/3275* (2016.01)

(52) U.S. Cl.
CPC ..... *G09G 3/3275* (2013.01); *G09G 2310/027* (2013.01); *G09G 2310/0291* (2013.01);
(Continued)

(58) Field of Classification Search
CPC .................................................... G09G 3/3275
(Continued)

(56) References Cited

U.S. PATENT DOCUMENTS

| | | | |
|---|---|---|---|
| 7,423,623 | B2 | 9/2008 | Akimoto et al. |
| 9,613,554 | B2 | 4/2017 | Jang et al. |

(Continued)

FOREIGN PATENT DOCUMENTS

| | | |
|---|---|---|
| KR | 10-0446391 | 8/2004 |
| KR | 10-1732468 B1 | 5/2017 |

(Continued)

OTHER PUBLICATIONS

Partial European Search Report dated Feb. 7, 2023 issued in corresponding European Patent Application No. 22195540.4 (16 pages).

(Continued)

*Primary Examiner* — Long D Pham
(74) *Attorney, Agent, or Firm* — F. CHAU & ASSOCIATES, LLC

(57) ABSTRACT

A display device including: a display panel including a plurality of pixels; a data driver configured to provide data voltages to the plurality of pixels; and a controller configured to control the data driver, to detect a same data region of the display panel when first image data in a current frame period is the same as second image data in a previous frame period, and not to transfer the first image data to the data driver in the current frame period.

20 Claims, 17 Drawing Sheets

(52) U.S. Cl.
CPC ... *G09G 2310/08* (2013.01); *G09G 2330/021* (2013.01); *G09G 2340/16* (2013.01)

(58) Field of Classification Search
USPC .......................................................... 345/212
See application file for complete search history.

(56) References Cited

U.S. PATENT DOCUMENTS

| | | | | |
|---|---|---|---|---|
| 9,905,167 | B2 | 2/2018 | Jeon et al. | |
| 9,922,614 | B2 | 3/2018 | Choi | |
| 10,255,872 | B2 | 4/2019 | Choi | |
| 10,553,175 | B2 | 2/2020 | Choi | |
| 11,132,937 | B2 | 9/2021 | Shin et al. | |
| 11,158,241 | B2 | 10/2021 | Lee et al. | |
| 11,423,817 | B2 | 8/2022 | Jung | |
| 11,450,260 | B2 | 9/2022 | Park et al. | |
| 11,488,537 | B2 | 11/2022 | Park et al. | |
| 11,501,678 | B2 | 11/2022 | Kim et al. | |
| 11,580,886 | B2 | 2/2023 | Kwon et al. | |
| 2002/0190973 | A1 | 12/2002 | Morita | |
| 2005/0151729 | A1 | 7/2005 | Akimoto et al. | |
| 2008/0238443 | A1* | 10/2008 | Ryu | G09G 3/006 324/629 |
| 2012/0056870 | A1 | 3/2012 | Koh | |
| 2014/0085276 | A1* | 3/2014 | Jang | G09G 3/2007 345/204 |
| 2014/0204064 | A1 | 7/2014 | Chen | |
| 2016/0043761 | A1 | 2/2016 | Kim et al. | |
| 2016/0098951 | A1* | 4/2016 | Kim | G09G 3/3688 345/212 |
| 2016/0111055 | A1 | 4/2016 | Na et al. | |
| 2016/0133179 | A1 | 5/2016 | Choi | |
| 2017/0004789 | A1 | 1/2017 | Takashimizu | |
| 2017/0295343 | A1 | 10/2017 | Konishi et al. | |
| 2018/0190235 | A1 | 7/2018 | Choi | |
| 2018/0286341 | A1 | 10/2018 | Nagasaka et al. | |
| 2019/0197979 | A1 | 6/2019 | Kim et al. | |
| 2019/0221182 | A1 | 7/2019 | Choi | |
| 2020/0092516 | A1 | 3/2020 | Moon et al. | |
| 2020/0105186 | A1 | 4/2020 | Shin | |
| 2020/0258454 | A1 | 8/2020 | Wang et al. | |
| 2020/0265778 | A1 | 8/2020 | Lee et al. | |
| 2020/0320922 | A1 | 10/2020 | Ko | |
| 2021/0035489 | A1 | 2/2021 | Seo et al. | |
| 2021/0110771 | A1 | 4/2021 | Lee et al. | |
| 2021/0174716 | A1 | 6/2021 | Noh et al. | |
| 2021/0201746 | A1 | 7/2021 | Seo et al. | |
| 2021/0233460 | A1 | 7/2021 | Kurokawa | |
| 2021/0280113 | A1 | 9/2021 | Ahn | |
| 2022/0028314 | A1 | 1/2022 | Kwon et al. | |
| 2022/0189363 | A1 | 6/2022 | Jung | |
| 2022/0189364 | A1 | 6/2022 | Park et al. | |
| 2022/0198998 | A1 | 6/2022 | Park et al. | |
| 2022/0319371 | A1 | 10/2022 | Kim et al. | |
| 2023/0081076 | A1 | 3/2023 | Lim et al. | |

FOREIGN PATENT DOCUMENTS

| | | |
|---|---|---|
| KR | 10-2020-0036119 | 4/2020 |
| KR | 10-2020-0118301 A | 10/2020 |
| KR | 10-2219091 | 2/2021 |
| KR | 10-2021-0026727 | 3/2021 |

OTHER PUBLICATIONS

European search report dated Jun. 19, 2023 from the European Patent Office for corresponding European Patent Application No. 22195540.4.

Office Action dated Feb. 12, 2025 from the Korean Intellectual Property Office (KIPO) issued in corresponding Korean Patent Application No. 10-2021-0124040.

* cited by examiner

NORMAL DRIVING MODE

SHUT DOWN MODE

ELECTRONIC DEVICE INCLUDING A DISPLAY DEVICE FOR NOT TRANSMITTING IMAGE DATA DURING PERIODS HAVING SAME DATA AND METHOD THEREOF

CROSS-REFERENCE TO RELATED APPLICATIONS

This application is a continuation of U.S. patent application Ser. No. 17/862,507 filed on Jul. 12, 2022, which claims priority under 35 U.S.C. § 119 to Korean Patent Application No. 10-2021-0124040, filed on Sep. 16, 2021 in the Korean Intellectual Property Office (KIPO), the disclosures of which are incorporated by reference herein in their entireties.

1. TECHNICAL FIELD

Embodiments of the present inventive concept relate to a display device, and more particularly to a display device including a data driver, and a method of operating the display device.

2. DESCRIPTION OF THE RELATED ART

A display device is an output device for the presentation of information in visual form. A display device may include a display panel that includes a plurality of pixels, a data driver that provides data voltages via data lines to the plurality of pixels, a scan driver that provides scan signals via scan lines to the plurality of pixels, and a controller that controls the data driver and the scan driver.

In the display device, the controller may transfer image data to the data driver in each frame period, and the data driver may provide the data voltages to the plurality of pixels based on the image data. Thus, in the display device, if the image data in a current frame period are the same as the image data in a previous frame period, the controller may transfer the image data to the data driver in the current frame period, and the data driver may provide the data voltages to the plurality of pixels based on the image data in the current frame period. In other words, the same image data may be resent to the data driver in the current period, and the data driver may resend the same data voltages to the plurality of pixels in the current frame period.

SUMMARY

Some embodiments of the present inventive concept provide a display device capable of reducing power consumption.

Some embodiments of the present inventive concept provide a method of operating a display device capable of reducing power consumption.

According to embodiments of the present inventive concept, there is provided a display device including: a display panel including a plurality of pixels; a data driver configured to provide data voltages to the plurality of pixels; and a controller configured to control the data driver, to detect a same data region of the display panel when first image data in a current frame period is the same as second image data in a previous frame period, and not to transfer the first image data to the data driver in the current frame period.

In a same data period corresponding to the same data region within the current frame period, at least a portion of components of the data driver is turned off.

In the same data period, a receiving block or an analog block of the data driver is turned off.

During a predetermined period before an end time point of the same data period, the controller transfers a clock training pattern to the data driver.

The display device may further include: a differential signal line including a first line and a second line located between the controller and the data driver, and configured to transfer the first and second image data; a switch coupled between the first line and the second line; and a termination resistor coupled in series with the switch between the first line and the second line, wherein, in a same data period corresponding to the same data region within the current frame period, a receiving block of the data driver controls the switch to be turned off.

Storage capacitors of the plurality of pixels in the same data region do not receive the data voltages from the data driver in the current frame period, and wherein the plurality of pixels in the same data region emits light in the current frame period based on the data voltages that are stored in the storage capacitors in the previous frame period.

In a same data period corresponding to the same data region within the current frame period, the data driver applies a shut down mode data voltage to a plurality of data lines of the display panel, and the shut down mode data voltage is not transferred to storage capacitors of the plurality of pixels in the same data region.

The data driver includes: a plurality of output buffers coupled to a plurality of data lines of the display panel; and a plurality of switches located between output terminals of the plurality of output buffers, and wherein, in a same data period corresponding to the same data region within the current frame period, the plurality of switches is turned on to couple the output terminals of the plurality of output buffers to each other, a first portion of the plurality of output buffers applies a shut down mode data voltage to the plurality of data lines, and a second portion of the plurality of output buffers is turned off.

The data driver includes: a plurality of output buffers coupled to a plurality of data lines of the display panel; at least one additional output buffer; and a plurality of switches located between output terminals of the plurality of output buffers and an output terminal of the additional output buffer, and wherein, in a same data period corresponding to the same data region within the current frame period, the plurality of switches is turned on to couple the output terminals of the plurality of output buffers and the output terminal of the additional output buffer, the additional output buffer applies a shut down mode data voltage to the plurality of data lines, and the plurality of output buffers is turned off.

The data driver includes: a plurality of output buffers coupled to a plurality of data lines of the display panel; at least one repair output buffer; and a plurality of switches located between output terminals of the plurality of output buffers and an output terminal of the repair output buffer, and wherein, in a same data period corresponding to the same data region within the current frame period, the plurality of switches is turned on to couple the output terminals of the plurality of output buffers and the output terminal of the repair output buffer, the repair output buffer applies a shut down mode data voltage to the plurality of data lines, and the plurality of output buffers is turned off.

The controller detects the same data region in each frame period.

The controller transfers frame configuration data to the data driver in a blank period of each frame period through a data transfer line, and wherein the frame configuration data includes a shut down mode bit representing whether the data driver operates in a shut down mode.

The controller detects a region of the display panel including at least one pixel row as the same data region.

The controller transfers frame configuration data to the data driver in a blank period of each frame period through a data transfer line, and wherein the frame configuration data includes: a shut down mode bit representing whether the data driver operates in a shut down mode in a same data period corresponding to the same data region; same data region start bits indicating a first pixel row of the same data region; and same data region end bits indicating a last pixel row of the same data region.

The controller transfers active line data for each pixel row of the display panel in an active period of each frame period through a data transfer line, and the active line data includes line configuration data, wherein the line configuration data for a first pixel row of the same data region includes a shut down mode bit having a first value indicating that the data driver operates in a shut down mode, and wherein the line configuration data for a pixel row next to a last pixel row of the same data region includes a shut down mode bit having a second value indicating that the data driver operates in a normal driving mode.

The display device further includes: a scan driver configured to provide scan signals to the plurality of pixels, wherein the scan driver does not provide the scan signals to the same data region in the current frame period.

Each of the plurality of pixels includes at least one n-type metal oxide semiconductor (NMOS) transistor.

According to embodiments of the present inventive concept, there is provided a display device including: a display panel including a plurality of pixels; a controller configured to output image data for the display panel; and a data driver including a receiving block configured to receive the image data from the controller, and an analog block configured to provide data voltages to the plurality of pixels based on the image data, wherein the controller detects a same data region of the display panel when the image data in a current frame period matches the image data in a previous frame period, and does not transfer the image data to the data driver in the current frame period, and wherein, in a same data period corresponding to the same data region within the current frame period, the receiving block or the analog block of the data driver is disabled.

According to embodiments of the present inventive concept, there is provided a method of operating a display device, the method including: comparing first image data in a current frame period and second image data in a previous frame period; detecting a same data region of a display panel of the display device when the first image data and the second image data are substantially the same; and turning off a transmitting block of a controller of the display device such that the first image data is not transferred from the controller to a data driver of the display device in the current frame period.

The method further including turning off a receiving block or an analog block of the data driver in a same data period corresponding to the same data region within the current frame period.

According to embodiments of the present inventive concept, there is provided a display device including: a display panel including a plurality of pixels; a data driver configured to provide data voltages to the plurality of pixels; and a controller configured to control the data driver to determine that a first portion of image data in a current frame period is the same as a second portion of image data in a previous frame period, and that a third portion of the image data in the current frame period is different from a fourth portion of the image data in the previous frame period, not to transfer the first portion of the image data to the data driver in the current frame period, and to transfer the third portion of the image data to the data driver in the current period.

A component of the data driver is at least partially disabled in the current frame period.

As described above, in a display device and a method of operating the display device according to embodiments of the present inventive concept, a controller may detect a same data region of a display panel, and may not transfer image data for the same data region to a data driver. In some embodiments of the present inventive concept, in a same data period allocated to the same data region, at least a portion of components (e.g., a receiving block and/or an analog block) of the data driver may be turned off. Accordingly, power consumption of the data driver and the display device may be reduced or minimized.

BRIEF DESCRIPTION OF THE DRAWINGS

Illustrative, non-limiting embodiments of the present inventive concept will be more clearly understood from the following detailed description in conjunction with the accompanying drawings.

DETAILED DESCRIPTION OF THE EMBODIMENTS

Figure 1:
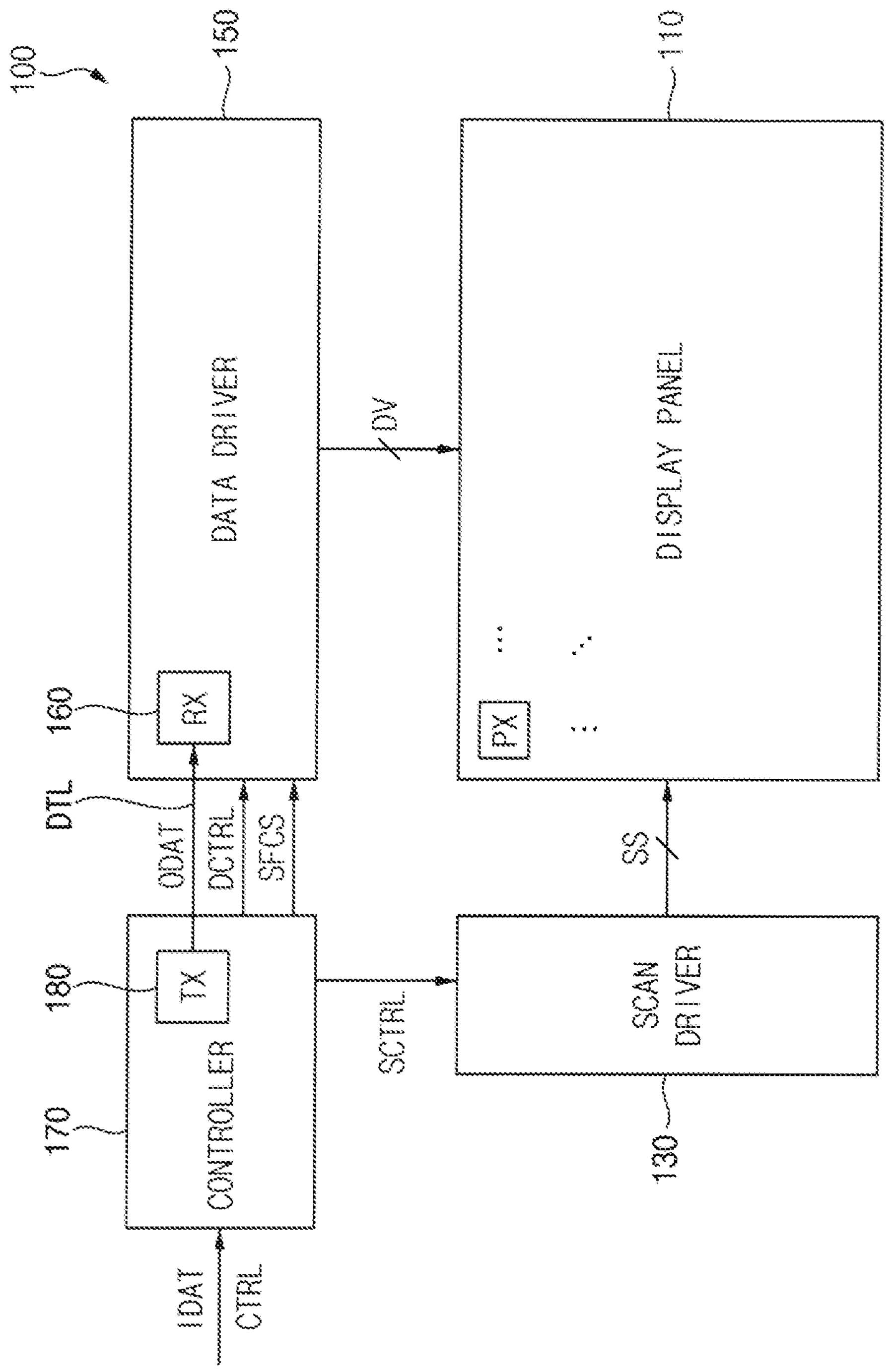
FIG. 1 is a block diagram illustrating a display device according to embodiments of the present inventive concept.

The embodiments of the present inventive concept are described more fully hereinafter with reference to the accompanying drawings. Like or similar reference numerals may refer to like or similar elements throughout.

Figure 2:
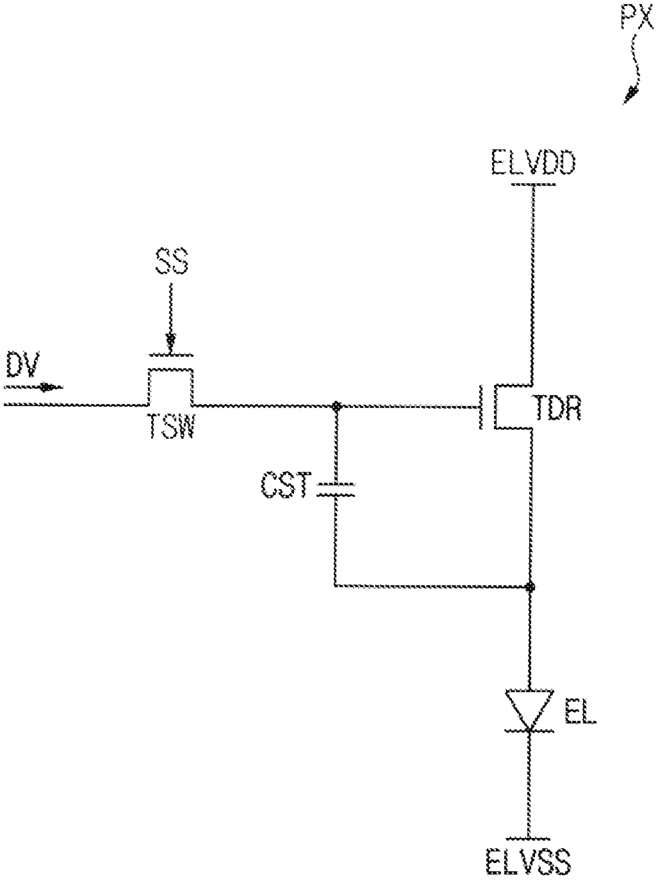
FIG. 2 is a circuit diagram illustrating an example of a pixel included in a display device according to embodiments of the present inventive concept.
Figure 3:
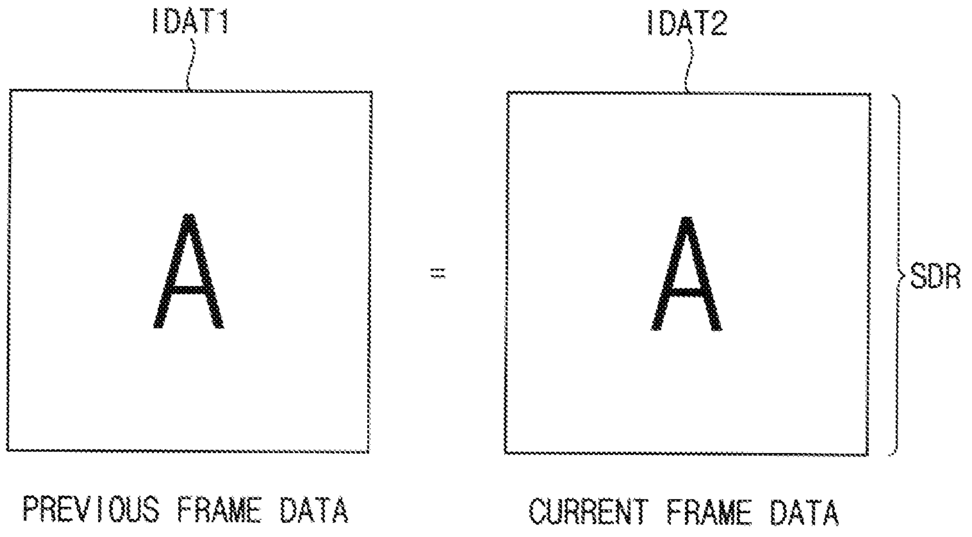
FIG. 3 is a diagram for describing an example where a same data region is detected in a display device according to embodiments of the present inventive concept.
Figure 4:
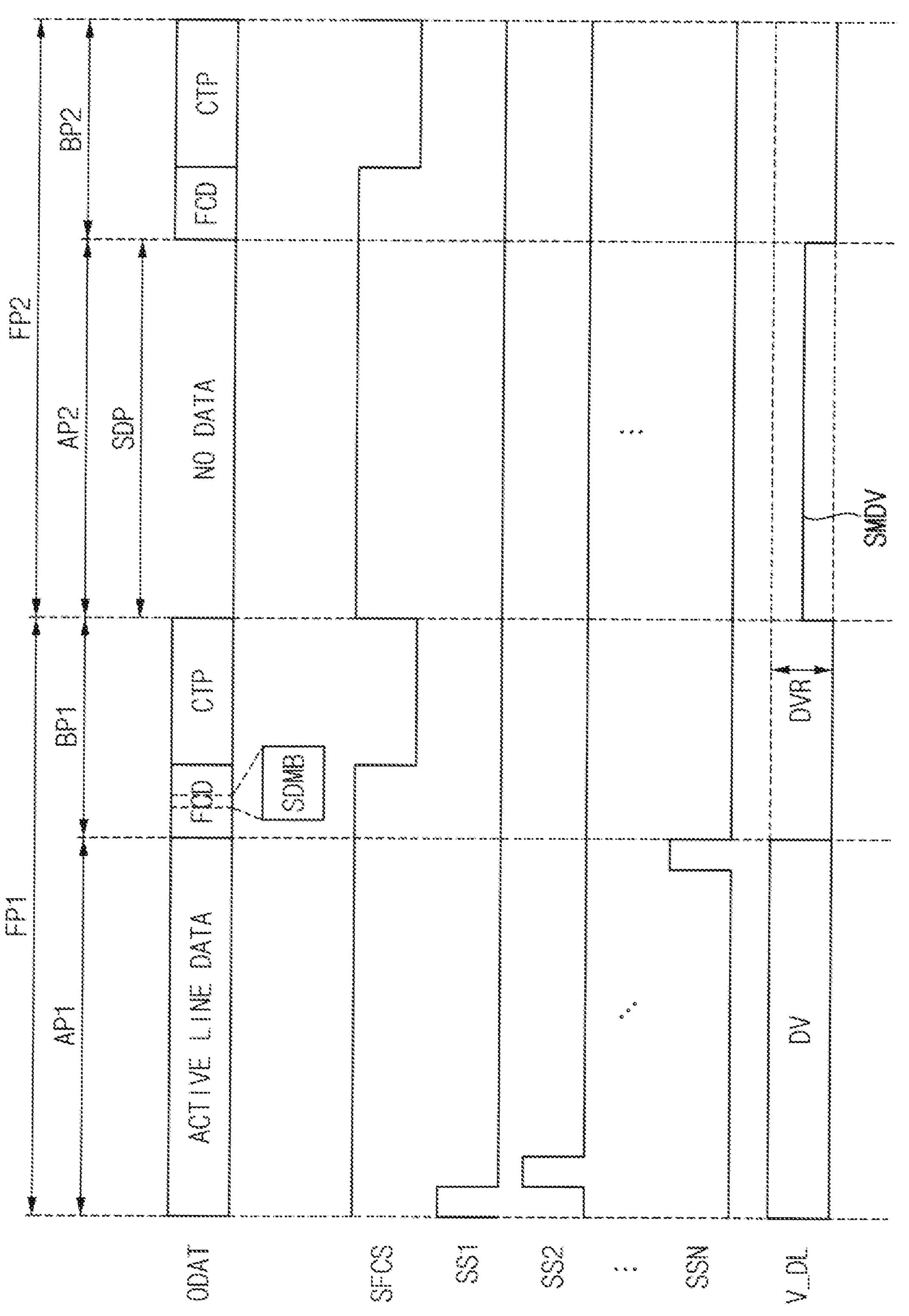
FIG. 4 is a timing diagram for describing an example of an operation of a display device according to embodiments of the present inventive concept.
Figure 5:
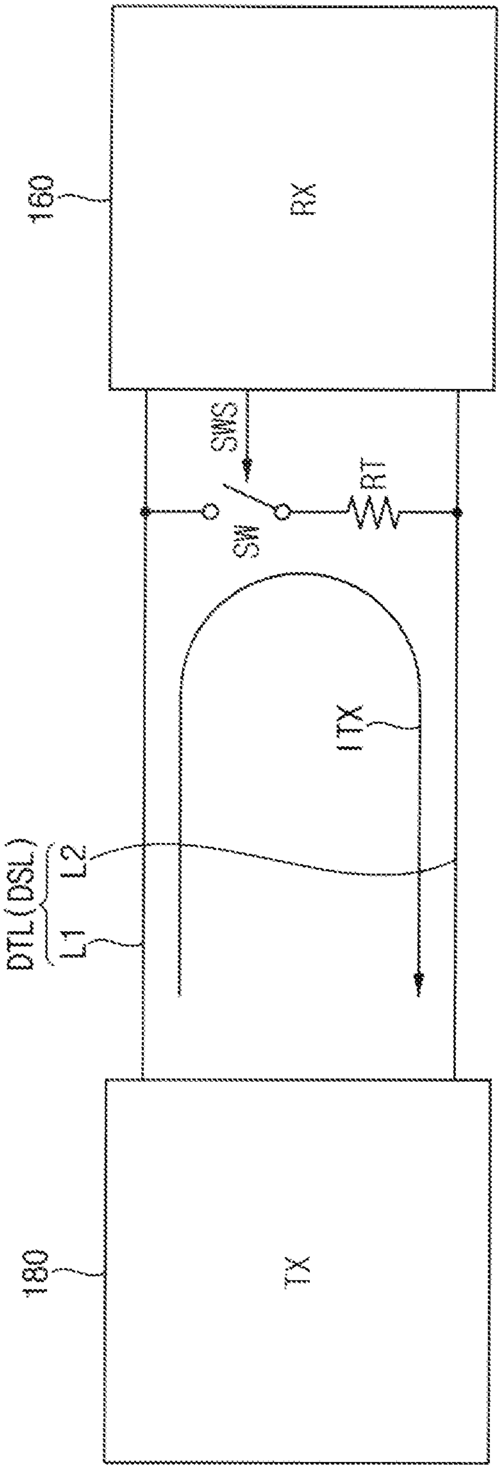
FIG. 5 is a diagram for describing an example of operations of a transmitting block and a receiving block of the present inventive concept.
Figure 6:
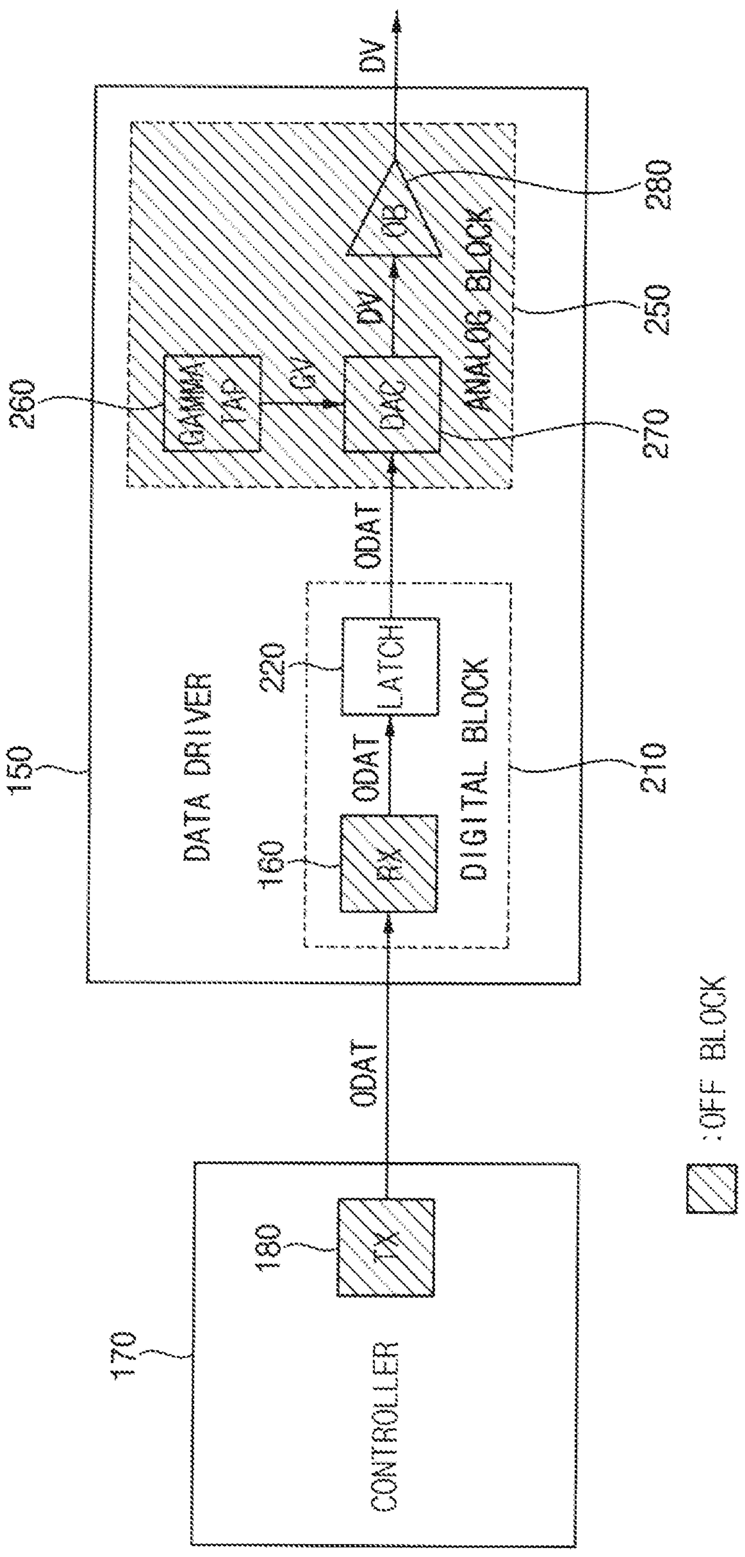
FIG. 6 is a block diagram for describing an example of blocks that are turned off in a same data period of the present inventive concept.

FIG. 1 is a block diagram illustrating a display device according to embodiments of the present inventive concept, FIG. 2 is a circuit diagram illustrating an example of a pixel included in a display device according to embodiments of the present inventive concept, FIG. 3 is a diagram for describing an example where a same data region is detected in a display device according to embodiments of the present inventive concept, FIG. 4 is a timing diagram for describing an example of an operation of a display device according to embodiments of the present inventive concept, FIG. 5 is a diagram for describing an example of operations of a transmitting block and a receiving block of the present inventive concept, and FIG. 6 is a block diagram for describing an example of blocks that are turned off in a same data period of the present inventive concept.

Referring to FIG. 1, a display device 100 according to embodiments may include a display panel 110 that includes a plurality of pixels PX, a scan driver 130 that provides scan signals SS to the plurality of pixels PX, a data driver 150 that provides data voltages DV to the plurality of pixels PX, and a controller 170 that controls the scan driver 130 and the data driver 150.

The display panel 110 may include a plurality of scan lines, a plurality of data lines, and the plurality of pixels PX coupled to the plurality of scan lines and the plurality of data lines. In some embodiments, as illustrated in FIG. 2, each pixel PX may include a switching transistor TSW that transfers the data voltage DV to a storage capacitor CST in response to the scan signal SS, the storage capacitor CST that stores the data voltage DV transferred by the switching transistor TSW, a driving transistor TDR that generates a driving current corresponding to the data voltage DV stored in the storage capacitor CST, and a light emitting element EL that emits light based on the driving current flowing from a line of a first power supply voltage ELVDD to a line of a second power supply voltage ELVSS.

In some embodiments, the light emitting element EL may be, but not limited to, an organic light emitting diode (OLED). For example, the light emitting element EL may be a quantum dot (QD) light emitting element or any other light emitting element. Further, in some embodiments, at least one of the switching and driving transistors TSW and TDR of each pixel PX may be implemented with an n-type metal oxide semiconductor (NMOS) transistor or an oxide transistor. For example, as illustrated in FIG. 2, all of the switching and driving transistors TSW and TDR of each pixel PX may be implemented with, but not limited to, the NMOS transistors. Although FIG. 2 illustrates an example of the pixel PX having a 2T1C structure including two transistors TSW and TDR and one capacitor CST, each pixel PX of the display device 100 according to embodiments is not limited to the 2T1C structure, and may have any pixel structure. For example, the pixels PX of the display device 100 may include up to seven transistors. Further, the display panel 110 is not limited to a light emitting display panel where each pixel PX includes the light emitting element EL. In other embodiments, the display panel 110 may be a liquid crystal display (LCD) panel, or any other suitable display panel.

The scan driver 130 may generate the scan signals SS based on a scan control signal SCTRL received from the controller 170, and may sequentially provide the scan signals SS to the plurality of pixels PX on a row-by-row basis through the plurality of scan lines. In some embodiments, the scan control signal SCTRL may include, but not limited to, a scan start signal, a scan clock signal, etc. In some embodiments, the scan driver 130 may be integrated or formed in a peripheral portion adjacent to a display region of the display panel 110. In other embodiments, the scan driver 130 may be integrated or formed in at least a portion of the display region of the display panel 110. In still other embodiments, the scan driver 130 may be implemented in a form of an integrated circuit.

The data driver 150 may generate the data voltages DV based on output image data ODAT and a data control signal DCTRL received from the controller 170, and may provide the data voltages DV to the plurality of pixels PX through the plurality of data lines. In some embodiments, as illustrated in FIG. 1, a receiving (RX) block 160 of the data driver 150 may receive the output image data ODAT through a data transfer line DTL from a transmitting (TX) block 180 of the controller 170. In some embodiments, the output image data ODAT may be transferred in a form of a clock embedded data signal where a clock signal is embedded in the output image data ODAT. Further, in some embodiments, the output image data ODAT or the clock embedded data signal may be, but not limited to, a differential signal, and the data transfer line DTL between the TX block 180 of the controller 170 and the RX block 160 of the data driver 150 may be, but not limited to, a differential signal DSL including a first line L1 and a second line L2 as illustrated in FIG. 5. In some embodiments, the data control signal DCTRL may include, but not limited to, a horizontal start signal, an output data enable signal, a load signal LOAD illustrated in FIG. 7, etc.

The data driver 150 may further receive a forward signal SFCS from the controller 170, and the forward signal SFCS may indicate whether a clock training pattern is transferred as the output image data ODAT through the data transfer line DTL. In some embodiments, the data driver 150 may be implemented with a plurality of data driver integrated circuits, and a line for transferring the forward signal SFCS may be shared by the plurality of data driver integrated circuits. In this case, the line for transferring the forward signal SFCS may be referred to as a shared forward channel. In other embodiments, the data driver 150 may be implemented with a single integrated circuit. In still other embodiments, the data driver 150 and the controller 170 may be implemented with a single integrated circuit, and the single integrated circuit may be referred to as a timing controller embedded data driver (TED).

The controller 170 (e.g., a timing controller) may receive input image data IDAT and a control signal CTRL from an external host processor (e.g., an application processor (AP), a graphics processing unit (GPU), a graphics card, etc.). For example, the input image data IDAT may be, but not limited to, RGB image data including red image data, green image data and blue image data. In some embodiments, the control signal CTRL may include, but not limited to, a vertical synchronization signal, a horizontal synchronization signal, an input data enable signal, a master clock signal, etc. The controller 170 may control an operation of the scan driver 130 by providing the scan control signal SCTRL to the scan driver 130, and may control an operation of the data driver 150 by providing the output image data ODAT and the data control signal DCTRL to the data driver 150.

In the display device 100 according to embodiments, the controller 170 may detect a same data region of the display panel 110 by comparing the input image data IDAT in a current frame period and the input image data IDAT in a previous frame period, and may not transfer the output image data ODAT for the same data region to the data driver 150 in the current frame period. In other words, the controller 170 may detect, for a first region of the display panel 110, that the input image data IDAT of the current frame period is the same as that of the previous frame period. In this case, the controller 170 may not transfer the output image data ODAT for the first region to the data driver 150 in the current frame period. In some embodiments, the controller 170 may detect the same data region in each and every frame period.

For example, as illustrated in FIG. 3, the controller 170 may compare first input image data IDAT1 in a previous frame period and second input image data IDAT2 in a current frame period. In a case where the second input image data IDAT2 in the current frame period are different from the first input image data IDAT1 in the previous frame period, the controller 170 may transfer the output image data ODAT corresponding to the second input image data IDAT2 to the data driver 150 in the current frame period. Alternatively, in a case where the second input image data IDAT2 in the current frame period are substantially the same as the first input image data IDAT1 in the previous frame period, the controller 170 may detect an entire region of the display panel 110 as the same data region SDR, and may not transfer the output image data ODAT for the entire region of the display panel 110 that is the same data region SDR to the data driver 150 in the current frame period.

Hereinafter, an example of an operation of the display device 100 according to embodiments will be described below with reference to FIGS. 1 and 4.

FIG. 4 illustrates an example where the input image data IDAT in a first frame period FP1 are different from the input image data IDAT in a previous frame period, and the input image data IDAT in a second frame period FP2 are substantially the same as the input image data IDAT in the first frame period FP1. Referring to FIGS. 1 and 4, in a first active period AP1 of the first frame period FP1, the controller 170 may transfer, as the output image data ODAT, a plurality of active line data for a plurality of pixel rows of the display panel 110 to the data driver 150 through the data transfer line DTL. The data driver 150 may generate the data voltages DV for the plurality of pixels PX based on the plurality of active line data, and may output the data voltages DV to the data lines of the display panel 110. Further, in the first active period AP1, the scan driver 130 may sequentially provide the scan signals SS1, SS2, . . . , SSN to the plurality of pixels PX on a pixel row basis. Accordingly, voltages V_DL of the data lines, or the data voltages DV may be transferred to the storage capacitors CST of the plurality of pixels PX in response to the scan signals SS1, SS2, . . . , SSN, and the plurality of pixels PX may emit light based on the data voltages DV stored in the storage capacitors CST.

In a first blank period BP1 of the first frame period FP1, the controller 170 may transfer frame configuration data FCD for frame control as the output image data ODAT to the data driver 150 through the data transfer line DTL. In some embodiments, the frame configuration data FCD may be referred to as a frame protocol. In some embodiments, the frame configuration data FCD may include a shut down mode bit SDMB representing whether the data driver 150 operates in a shut down mode. For example, in a case where the input image data IDAT in the second frame period FP2 are different from the input image data IDAT in the first frame period FP1, the controller 170 may transfer the frame configuration data FCD (in the first blank period BP1) including the shut down mode bit SDMB having a second value (e.g., a low level) indicating that the data driver 150 operates in a normal driving mode to the data driver 150 through the data transfer line DTL. Alternatively, in a case where the input image data IDAT in the second frame period FP2 are substantially the same as the input image data IDAT in the first frame period FP1 as illustrated in FIG. 4, the controller 170 may transfer the frame configuration data FCD (in the first blank period BP1) including the shut down mode bit SDMB having a first value (e.g., a high level) indicating that the data driver 150 operates in the shut down mode to the data driver 150 through the data transfer line DTL. In another embodiment, the shut down mode bit SDMB have a low level indicating that the data driver 150 operates in the shut down mode and a high level indicating that the data driver 150 operates in a normal driving mode.

Further, in the first blank period BP1, the controller 170 may transfer a clock training pattern CTP as the output image data ODAT to the data driver 150 through the data transfer line DTL. In some embodiments, while the clock training pattern CTP is transferred through the data transfer line DTL, the controller 170 may transfer the forward signal SFCS having a low level to the data driver 150. The data driver 150 may know that the clock training pattern CTP is transferred through the data transfer line DTL based on the forward signal SFCS having the low level. In some embodiments, the RX block 160 of the data driver 150 may include a clock data recovery (CDR) circuit that recovers a clock signal and data, and the CDR circuit may perform a clock training operation that adjusts or corrects a frequency and/or a phase of the recovered clock signal based on the clock training pattern CTP.

As illustrated in FIG. 4, in the case where the input image data IDAT in the second frame period FP2 are substantially the same as the input image data IDAT in the first frame period FP1, the controller 170 may detect the entire region of the display panel 110 as the same data region SDR, and may not transfer the output image data ODAT for the entire region of the display panel 110 that is the same data region SDR to the data driver 150 (e.g., “NO DATA” are transferred) in a second active period AP2 of the second frame period FP2. Thus, the data driver 150 may not provide the data voltages DV to the plurality of pixels PX in the second active period AP2. Further, the scan driver 130 may not provide the scan signals SS1, SS2, . . . , SSN to the same data region SDR, or the entire region of the display panel 110 in the second active period AP2. In other words, in the second active period AP2, the scan signals SS1, SS2, . . . , SSN may have a low level. The storage capacitors CST of the pixels PX in the same data region SDR, or the entire region of the display panel 110 may not receive the data voltages DV from the data driver 150 in the second frame period FP2. Thus, in the second frame period FP2, all the pixels PX of the display panel 110 may maintain the data voltages DV that are stored in the storage capacitors CST in the first frame period FP1, and may emit light based on the maintained data voltages DV. In some embodiments, each pixel PX may include the NMOS transistors having a small leakage current, and a luminance of the pixel PX in the second frame period FP2 may be substantially the same as a luminance of the pixel PX in the first frame period FP1. In some embodiments, the controller 170 may count the number of frame periods having the same input image data IDAT, and may transfer the output image data ODAT to the data driver 150 each time the counted number becomes a predetermined number. In this case, even if the input image data IDAT represent the same image, an image quality degradation of the display panel 110 may be further prevented.

Further, in a same data period SDP allocated to the same data region SDR within a current frame period, or in the same data period SDP allocated to the entire region of the display panel 110 within the second frame period FP2, at least a portion of components of the controller 170 and/or at least a portion of components of the data driver 150 may be (e.g., turned or powered) off. In some embodiments, in the same data period SDP, the TX block 180 of the controller 170 may be off, and/or power consumption of the TX block 180 may be reduced.

For example, as illustrated in FIG. 5, the data transfer line DTL for transferring the output image data ODAT between the controller 170 and the data driver 150 may include the first line L1 and the second line L2, and may be a differential signal line DSL for transferring a differential signal as the output image data ODAT. The display device 100 may further include a switch SW and a termination resistor RT that are coupled in series between the first line L1 and the second line L2. The TX block 180 of the controller 170 may output a transmission current ITX to the differential signal line DSL, and the RX block 160 of the data driver 150 may receive the output image data ODAT by detecting a voltage formed between both terminals of the termination resistor RT by the transmission current ITX. In the same data period SDP allocated to the same data region SDR, the RX block 160 may control the switch SW between the first line L1 and the second line L2 to be turned off. For example, the RX block 160 may provide the switch SW with a switching signal SWS for turning off the switch SW. While the switch SW is turned off, the transmission current ITX may not flow through the differential signal line DSL and the termination resistor RT, the output image data ODAT may not be transferred through the differential signal line DSL (or the data transfer line DTL), and power consumption for transferring the output image data ODAT may be reduced or prevented.

Further, in some embodiments, in the same data period SDP allocated to the same data region SDR, at least a portion of components of the data driver 150 may be (e.g., turned or powered) off. For example, as illustrated in FIG. 6, the data driver 150 may include a digital block 210 that performs digital processing and an analog block 250 that performs analog processing. The digital block 210 may include the RX block 160 that receives the output image data ODAT from the TX block 180 of the controller 170, and a latch block 220 that temporarily stores the output image data ODAT. Further, the analog block 250 may include a gamma tap block 260 that generates gray voltages GV, a digital-to-analog conversion (DAC) block 270 that selects the gray voltages GV corresponding to the output image data ODAT to output the selected gray voltages GV as the data voltages DV, and an output buffer (OB) block 280 that outputs the data voltages DV to the data lines. Each component of the data driver 150 and controller 170 shown in FIG. 6 may be implemented by a circuit. In some embodiments, as illustrated in FIG. 6, in the same data period SDP allocated to the same data region SDR, the TX block 180 of the controller 170, the RX block 160 of the data driver 150 and the analog block 250 (e.g., the gamma tap block 260, the DAC block 270 and/or the OB block 280) of the data driver 150 may be turned off. In other words, these components may not be powered on or may be in a low power mode. Accordingly, in the same data period SDP, power consumption of the data driver 150 and the display device 100 according to embodiments may be reduced.

Referring again to FIGS. 1 and 4, in some embodiments, in the same data period SDP allocated to the same data region SDR, the data driver 150 may apply a shut down mode data voltage SMDV to the data lines of the display panel 110. In some embodiments, the shut down mode data voltage SMDV may be determined within a range DVR of the data voltages DV. For example, the a shut down mode data voltage SMDV in the second frame period FP2 may be determined as, but not limited to, an average voltage of the data voltages DV in the first frame period FP1. In other words, the shut down mode data voltage SMDV may be less than the data voltages DV of the first frame period FP1. Since the shut down mode data voltage SMDV is applied to the data lines in the same data period SDP, power consumption for charging or discharging the data lines in a subsequent frame period may be reduced, and hysteresis characteristics of the driving transistors TDR of the pixels PX may be improved. Further, in the same data period SDP, since the scan signals SS1, SS2, . . . , SSN are not provided to the same data region SDR, the switching transistors TSW of the pixels PX in the same data region SDR may not be turned on, and thus the voltage V_DL of the data lines, or the shut down mode data voltage SMDV may not be transferred to the storage capacitors CST of the pixels PX in the same data region SDR.

Thereafter, in a second blank period BP2 of the second frame period FP2, the controller 170 may transfer the frame configuration data FCD and the clock training pattern CTP as the output image data ODAT to the data driver 150 through the data transfer line DTL. Further, while the clock training pattern CTP is transferred through the data transfer line DTL, the controller 170 may transfer the forward signal SFCS having the low level to the data driver 150.

As described above, in the display device 100 according to embodiments, the controller 170 may detect the same data region SDR of the display panel 110, and may not transfer image data (e.g., the output image data ODAT) for the same data region SDR to the data driver 150. Further, in the same data period SDP allocated to the same data region SDR, at least a portion of components (e.g., the TX block 180) of the controller 170 and/or at least a portion of components (e.g., the RX block 160 and/or the analog block 250) of the data driver 150 may be turned off. Accordingly, the power consumption of the data driver 150 and the display device 100 may be reduced or minimized.

According to an embodiment of the present inventive concept, the display device 100 includes: the display panel 110 including a plurality of pixels PX; the data driver 150 configured to provide data voltages DV to the plurality of pixels PX; and a controller 170 configured to control the data driver 150, to detect a same data region SDR of the display panel 110 when first image data in a current frame period (e.g., IDAT2) is the same as second image data in a previous frame period (e.g., IDAT1), and not to transfer the first image data (e.g., IDAT2) to the data driver 150 in the current frame period.

Figure 7:
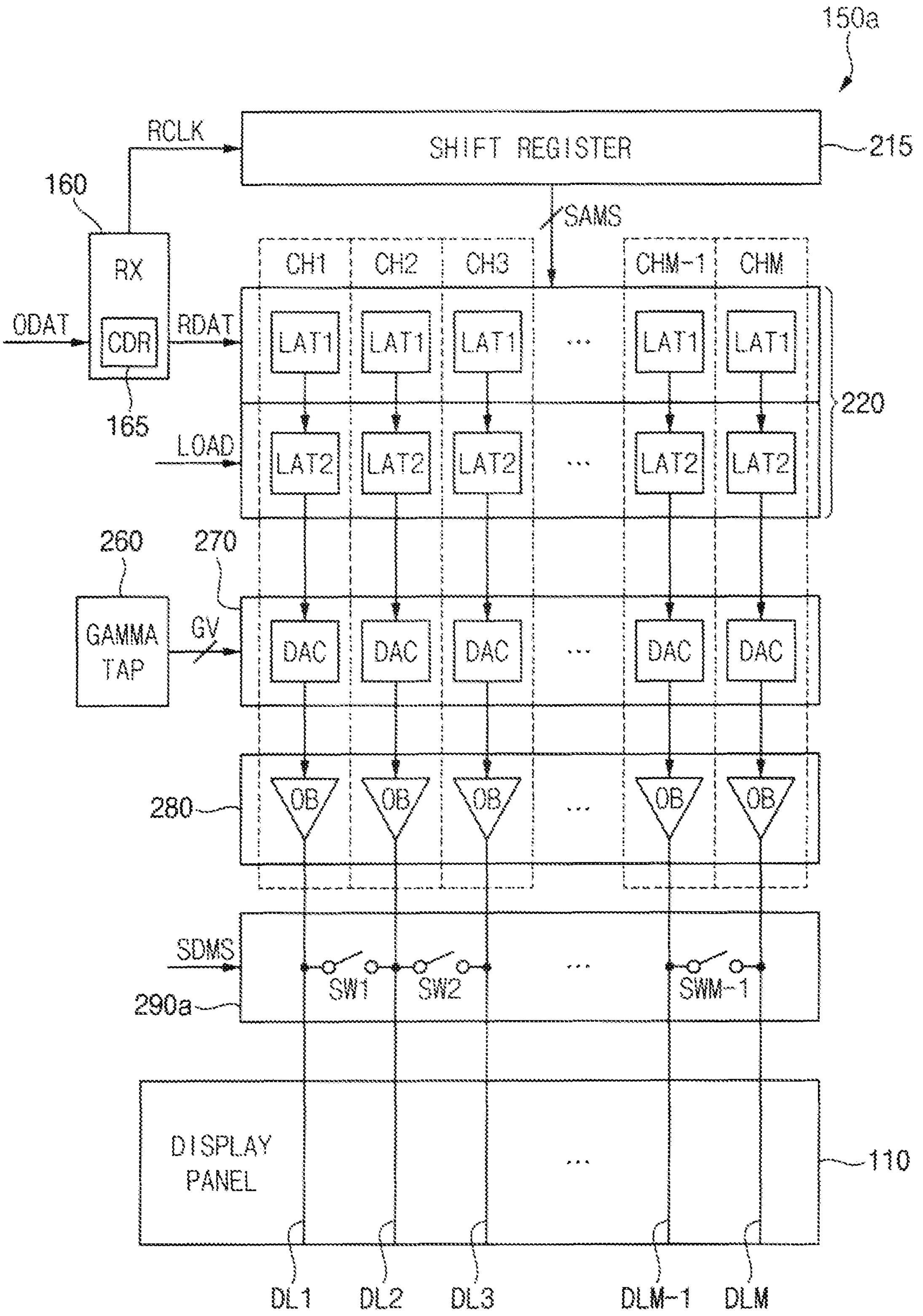
FIG. 7 is a block diagram illustrating a data driver according to embodiments of the present inventive concept.
Figure 8A:
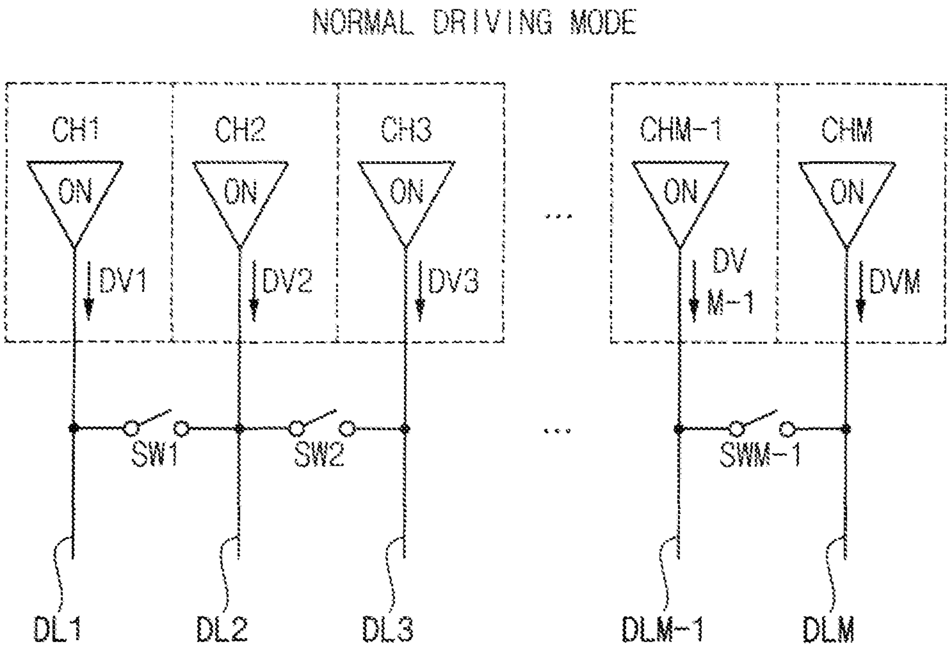
FIG. 8A is a diagram for describing an example of an operation of a data driver of FIG. 7 in a normal driving mode.
Figure 8B:
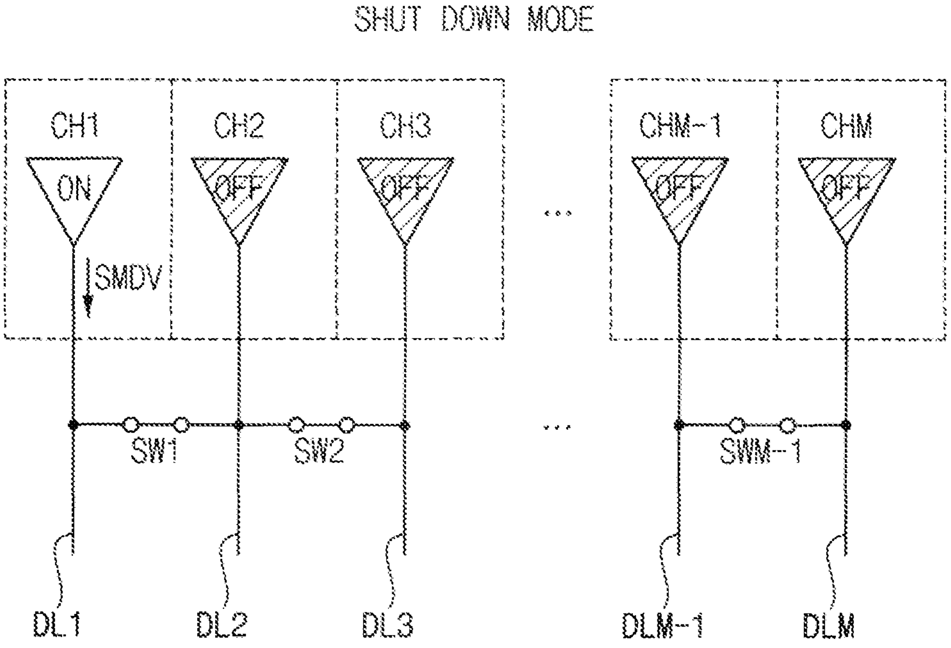
FIG. 8B is a diagram for describing an example of an operation of a data driver of FIG. 7 in a shut down mode.

FIG. 7 is a block diagram illustrating a data driver according to embodiments of the present inventive concept, FIG. 8A is a diagram for describing an example of an operation of a data driver of FIG. 7 in a normal driving mode, and FIG. 8B is a diagram for describing an example of an operation of a data driver of FIG. 7 in a shut down mode.

Referring to FIG. 7, a data driver 150*a* may include a RX block 160, a shift register 215, a latch block 220, a gamma tap block 260, a digital-to-analog converting block 270, an output buffer block 280 and a switch block 290*a*.

The RX block 160 may receive output image data ODAT from a controller. In some embodiments, the output image data ODAT may be transferred in a form of a clock embedded data signal, and the RX block 160 may include a CDR circuit 165 for recovering a clock signal and image data from the clock embedded data signal. The RX block 160 may output a recovered clock signal RCLK and recovered image data RDAT. The recovered clock signal RCLK may be provided to the shift register 215 and the recovered image data RDAT may be provided to the latch block 220.

The shift register 215 may generate sampling signals SAMS based on the recovered clock signal RCLK. In some embodiments, the shift register 215 may include a plurality of flip-flops that performs a shift operation in response to the recovered clock signal RCLK to generate the sampling signals SAMS.

The latch block 220 may sequentially store the recovered image data RDAT in response to the sampling signals SAMS, and may output the recovered image data RDAT for one pixel row in response to a load signal LOAD. In some embodiments, the latch block 220 may include a plurality of first latches LAT1 that sequentially store the recovered image data RDAT in response to the sampling signals SAMS, and a plurality of second latches LAT2 that load and output the recovered image data RDAT of the plurality of first latches LAT1 in response to the load signal LOAD. For example, the latch block 220 may include, but not limited to, M first latches LAT1 and M second latches LAT2 in M channels CH1, CH2, CH3, . . . , CHM−1 and CHM, where M is an integer greater than 1. For example, a first channel CH1 may include one first latch LAT1 and one second latch LAT2.

The gamma tap block 260 may generate a plurality of gray voltages GV respectively corresponding to a plurality of gray levels. For example, the gamma tap block 260 may generate, but not limited to, two hundred fifty six gray voltages GV respectively corresponding to two hundred fifty six gray levels from a 0-gray level to a 255-gray level.

The digital-to-analog converting block 270 may receive the recovered image data RDAT for one pixel row from the latch block 220, may receive the gray voltages GV from the gamma tap block 260, and may convert the recovered image data RDAT into data voltages based on the gray voltages GV. In some embodiments, the digital-to-analog converting block 270 may include a plurality of digital-to-analog converters DAC. Each digital-to-analog converter DAC may select a gray voltage GV corresponding to a gray level represented by corresponding pixel data included in the recovered image data RDAT, and may output the selected gray voltage GV as the data voltage. For example, the digital-to-analog converting block 270 may include, but not limited to, M digital-to-analog converters DAC in the M channels CH1 through CHM. For example, the first channel CH1 may include one digital-to-analog converter DAC.

The output buffer block 280 may receive the data voltages from the digital-to-analog converting block 270, and may output the data voltages to data lines DL1, DL2, DL3, . . . , DLM−1 and DLM of a display panel 110. In some embodiments, the output buffer block 280 may include a plurality of output buffers OB coupled to the data lines DL1 through DLM of the display panel 110. For example, the output buffer block 280 may include, but not limited to, M output buffers OB in the M channels CH1 through CHM. For example, the first channel CH1 may include one output buffer OB. Further, the M output buffers OB may be coupled to M data lines DL1 through DLM, respectively.

The switch block 290*a* may selectively couple a plurality of channels CH1 through CHM, or output terminals of the plurality of output buffers OB in response to a shut down mode signal SDMS. In other words, the switch block 290*a* may connect the output terminals of all the output buffers OB to each other or fewer than all of the output buffers OB to each other. For example, the switch block 290*a* may not couple the output terminals of the plurality of output buffers OB when the shut down mode signal SDMS has a first level, and may couple the output terminals of the plurality of output buffers OB to each other when the shut down mode signal SDMS has a second level. In some embodiments, the switch block 290*a* may include a plurality of switches SW1, SW2, . . . , SWM−1 located between the output terminals of the plurality of output buffers OB. For example, a first switch SW1 may be located between the output terminals of the output buffers OB of the first and second channels CH1 and CH2. For example, the switch block 290*a* may include, but not limited to, M−1 switches SW1 through SWM−1 located between the output terminals of the M output buffers OB.

For example, in a normal driving mode, as illustrated in FIG. 8A, the data driver 150*a* may output the data voltages DV1, DV2, DV3, . . . , DVM−1 and DVM to the data lines DL1 through DLM. In the normal driving mode, the M output buffers OB in the M channels CH1 through CHM may normally operate, and may be ON. In this case, the M output buffers OB may output M data voltages DV1 through DVM. The M−1 switches SW1 through SWM−1 of the switch block 290*a* may be turned off, and may not couple the M data lines DL1 through DLM to each other. Thus, the M data voltages DV1 through DVM output by the M output buffers OB may be applied to the M data lines DL1 through DLM, respectively.

In a same data period allocated to a same data region, the data driver 150*a* may operate in a shut down mode. In the shut down mode, as illustrated in FIG. 8B, the data driver 150*a* may apply a shut down mode data voltage SMDV to the data lines DL1 through DLM. Further, in the same data period allocated to the same data region, or in the shut down mode, the M−1 switches SW1 through SWM−1 of the switch block 290*a* may be turned on in response to the shut down mode signal SDMS, and the M−1 turned-on switches SW1 through SWM−1 may couple the M channels CH1 through CHM, or the output terminals of the M output buffers OB to each other. Further, in the shut down mode, a first portion of the M output buffers OB may output the shut down mode data voltage SMDV, and a second portion of the M output buffers OB may be OFF. For example, as illustrated in FIG. 8B, in the same data period allocated to the same data region, or in the shut down mode, the output buffer OB in one channel CH1 among the M channels CH1 through CHM may output the shut down mode data voltage SMDV, and the remaining M−1 output buffers OB in the remaining M−1 channels CH2 through CHM may be OFF. Although the shut down mode data voltage SMDV is output by one output buffer OB in this example, since the M−1 switches SW1 through SWM−1 couples the output terminals of the M output buffers OB to each other, the shut down mode data voltage SMDV may be applied to all the M data lines DL1 through DLM.

Although FIGS. 7 through 8B illustrate an example where the data driver 150*a* includes the M−1 switches SW1 through SWM−1 for coupling the M channels CH1 through CHM to each other, and the one output buffer OB in the one channel CH1 applies the shut down mode data voltage SMDV to the M data lines DL1 through DLM in the shut down mode, the number of the switches SW1 through SWM−1 and the number of the output buffers OB that are ON in the shut down mode according to embodiments are not limited to the example in FIGS. 7 through 8B. For example, the data driver 150*a* may include M−2 switches for coupling the M channels CH1 through CHM to each other, and two output buffers OB in two channels may apply the shut down mode data voltage SMDV to the M data lines DL1 through DLM in the shut down mode. Further, the number of the output buffers OB that are ON in the shut down mode may be determined depending on a load of the data lines DL1 through DLM and a driving capability of each output buffer OB.

Figure 9:
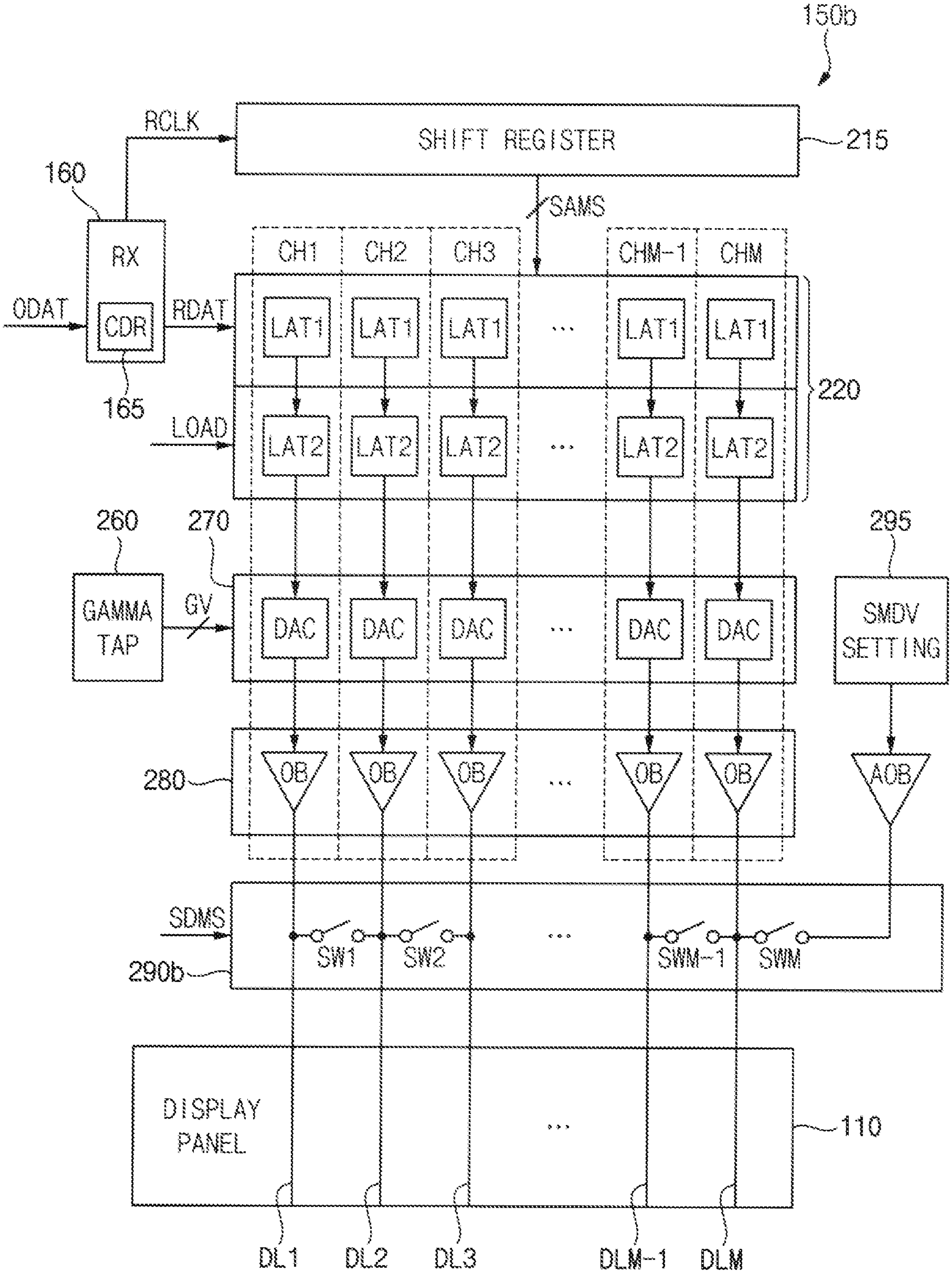
FIG. 9 is a block diagram illustrating a data driver according to embodiments of the present inventive concept.
Figure 10A:
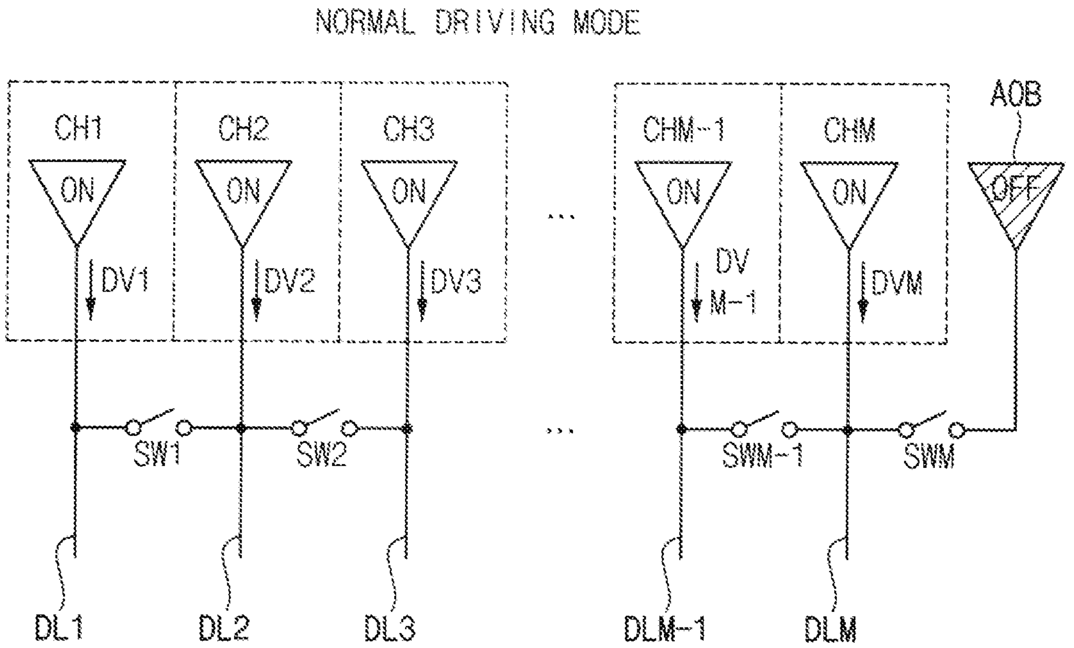
FIG. 10A is a diagram for describing an example of an operation of a data driver of FIG. 9 in a normal driving mode.
Figure 10B:
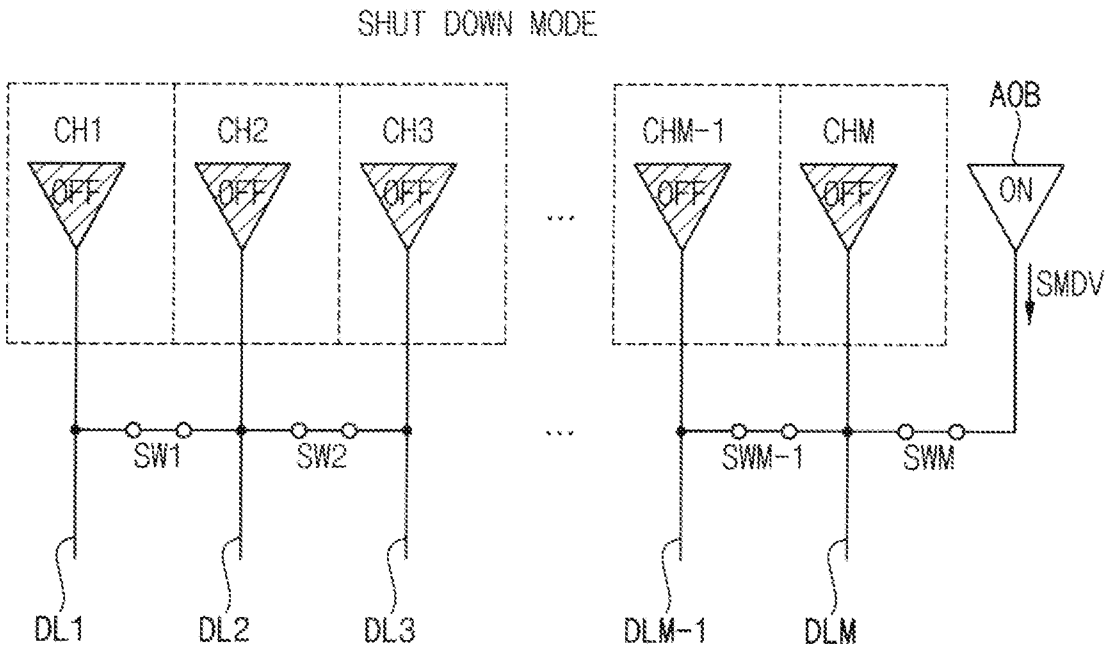
FIG. 10B is a diagram for describing an example of an operation of a data driver of FIG. 9 in a shut down mode.

FIG. 9 is a block diagram illustrating a data driver according to embodiments of the present inventive concept, FIG. 10A is a diagram for describing an example of an operation of a data driver of FIG. 9 in a normal driving mode, and FIG. 10B is a diagram for describing an example of an operation of a data driver of FIG. 9 in a shut down mode.

Referring to FIG. 9, a data driver 150*b* may include a RX block 160, a shift register 215, a latch block 220, a gamma tap block 260, a digital-to-analog converting block 270, an output buffer block 280, a switch block 290*b*, a shut down mode data voltage setting block 295 and at least one additional output buffer AOB. The data driver 150*b* of FIG. 9 may have a similar configuration and a similar operation to a data driver 150*a* of FIG. 7, except that the data driver 150*b* may further include the shut down mode data voltage setting block 295 and the additional output buffer AOB, and the switch block 290*b* may further include a switch SWM that couples an output terminal of the additional output buffer AOB to a plurality of channels CH1 through CHM.

The shut down mode data voltage setting block 295 may set a voltage level of a shut down mode data voltage SMDV, and may provide the shut down mode data voltage SMDV to the additional output buffer AOB. In some embodiments, the data driver 150*b* may receive setting data (e.g., included in frame configuration data or line configuration data) from a controller, and may set the voltage level of the shut down mode data voltage SMDV based on the setting data. Further, in some embodiments, the shut down mode data voltage setting block 295 may include, but not limited to, a latch that receives and stores the setting data from the controller, and a digital-to-analog converter that converts the setting data into the shut down mode data voltage SMDV.

In a normal driving mode, as illustrated in FIG. 10A, a plurality of switches SW1 through SWM of the switch block 290*b* may not couple output terminals of a plurality of output buffers OB of the output buffer block 280 and the output terminal of the additional output buffer AOB, and the additional output buffer AOB may be OFF. Further, in the normal driving mode, all the output buffers OB in the plurality of channels CH1 through CHM may be ON, and may apply a plurality of data voltages DV1 through DVM to a plurality of data lines DL1 through DLM, respectively.

In a same data period allocated to a same data region, or in a shut down mode, as illustrated in FIG. 10B, the plurality of switches SW1 through SWM of the switch block 290*b* may be turned on to couple the output terminals of the plurality of output buffers OB of the output buffer block 280 and the output terminal of the additional output buffer AOB to each other, and the additional output buffer AOB may be ON. The additional output buffer AOB may output the shut down mode data voltage SMDV, and the shut down mode data voltage SMDV output by the additional output buffer AOB may be applied to the plurality of data lines DL1 through DLM. Further, all the output buffers OB in the plurality of channels CH1 through CHM may be OFF.

Although FIGS. 9 through 10B illustrate an example where the data driver 150*b* includes one additional output buffer AOB, the number of the additional output buffer AOB included in the data driver 150*b* is not limited to the example in FIGS. 9 through 10B.

Figure 11:
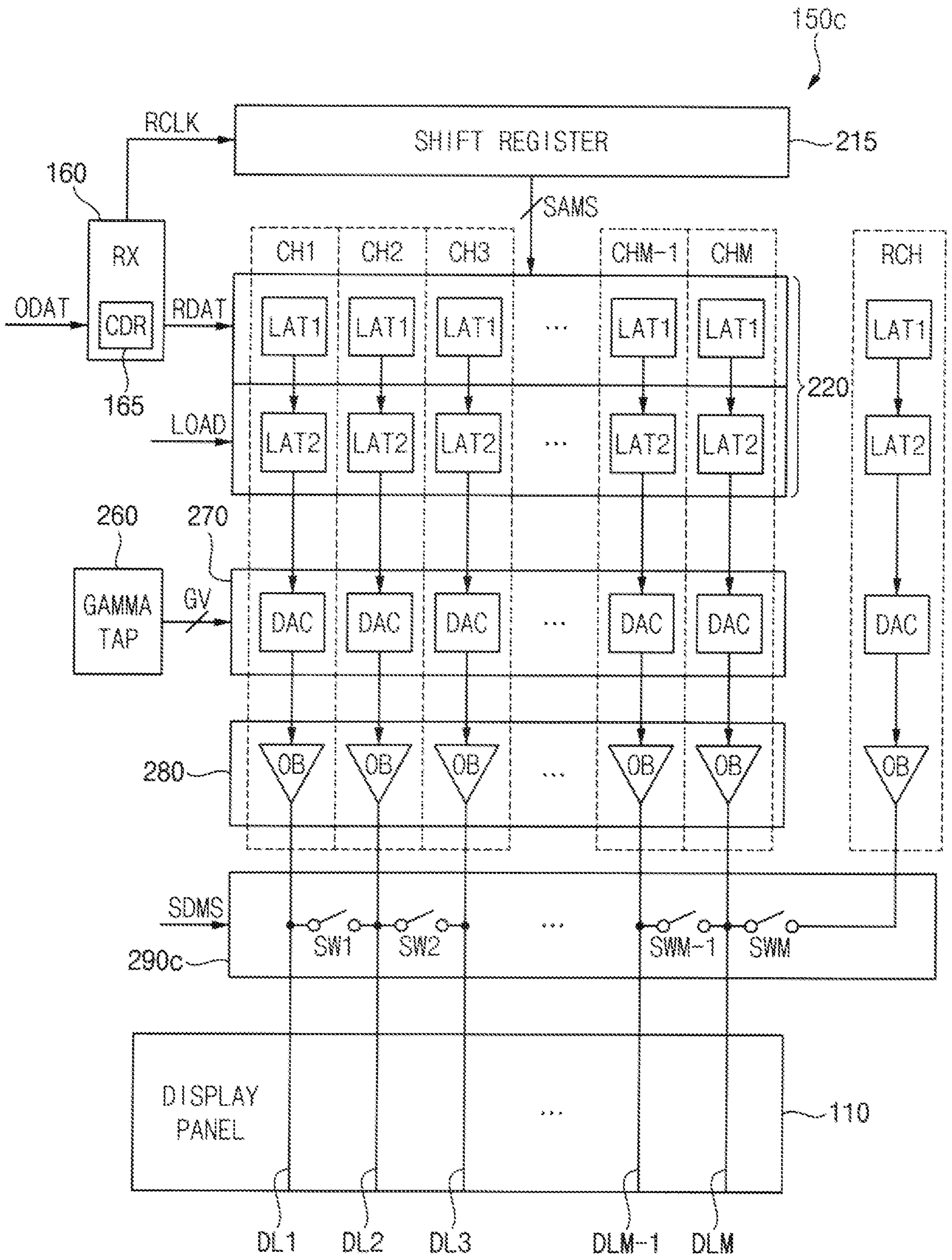
FIG. 11 is a block diagram illustrating a data driver according to embodiments of the present inventive concept.
Figure 12A:
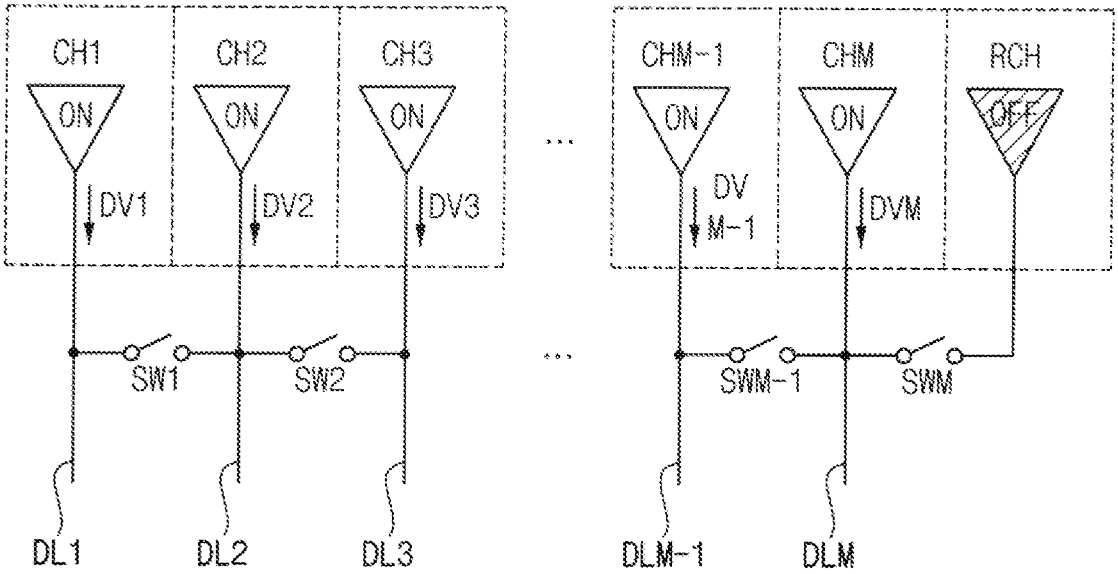
FIG. 12A is a diagram for describing an example of an operation of a data driver of FIG. 11 in a normal driving mode.
Figure 12B:
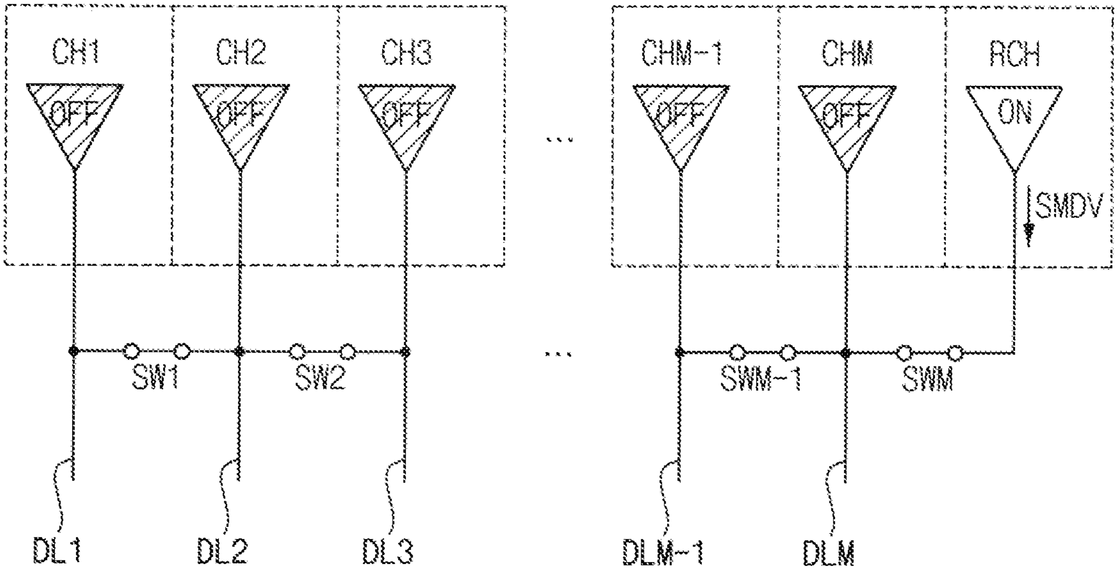
FIG. 12B is a diagram for describing an example of an operation of a data driver of FIG. 11 in a shut down mode.

FIG. 11 is a block diagram illustrating a data driver according to embodiments of the present inventive concept, FIG. 12A is a diagram for describing an example of an operation of a data driver of FIG. 11 in a normal driving mode, and FIG. 12B is a diagram for describing an example of an operation of a data driver of FIG. 11 in a shut down mode.

Referring to FIG. 11, a data driver 150*c* may include a RX block 160, a shift register 215, a latch block 220, a gamma tap block 260, a digital-to-analog converting block 270, an output buffer block 280, a switch block 290*c* and at least one repair channel RCH. The data driver 150*c* of FIG. 11 may have a similar configuration and a similar operation to a data driver 150*a* of FIG. 7, except that the data driver 150*c* may further include the repair channel RCH that is to be used instead of a defective channel among a plurality of channels CH1 through CHM, and the switch block 290*c* may further include a switch SWM that couples the repair channel RCH to the plurality of channels CH1 through CHM.

Similarly to each of the plurality of channels CH1 through CHM, the repair channel RCH may include a first latch LAT1, a second latch LAT2, a digital-to-analog converter DAC and an output buffer (or a repair output buffer) OB. In a case where one of the plurality of channels CH1 through CHM is defective, the repair channel RCH may be used instead of the defective channel. Alternatively, in a case where no channel is defective in a display device including the data driver 150*c*, the repair channel RCH may be used to provide a shut down mode data voltage SMDV. For example, the repair output buffer OB in the repair channel RCH, which is to be used instead of a defective output buffer of a plurality of output buffers OB in the plurality of channels CH1 through CHM, may be used to apply the shut down mode data voltage SMDV.

In a normal driving mode, as illustrated in FIG. 12A, a plurality of switches SW1 through SWM of the switch block 290*c* may not couple output terminals of the plurality of output buffers OB of the output buffer block 280 in the plurality of channels CH1 through CHM and an output terminal of the repair output buffer OB in the repair channel RCH, and the repair output buffer OB in the repair channel RCH may be OFF. Further, in the normal driving mode, all the output buffers OB of the output buffer block 280 in the plurality of channels CH1 through CHM may be ON, and may apply a plurality of data voltages DV1 through DVM to a plurality of data lines DL1 through DLM, respectively.

In a same data period allocated to a same data region, or in a shut down mode, as illustrated in FIG. 12B, the plurality of switches SW1 through SWM of the switch block 290*c* may be turned on to couple the output terminals of the plurality of output buffers OB of the output buffer block 280 in the plurality of channels CH1 through CHM and the output terminal of the repair output buffer OB in the repair channel RCH to each other, and the repair output buffer OB in the repair channel RCH may be ON. The repair output buffer OB in the repair channel RCH may output the shut down mode data voltage SMDV, and the shut down mode data voltage SMDV output by the repair output buffer OB in the repair channel RCH may be applied to the plurality of data lines DL1 through DLM. Further, all the output buffers OB of the output buffer block 280 in the plurality of channels CH1 through CHM may be OFF.

Although FIGS. 11 through 12B illustrates an example where the data driver 150*c* includes one repair channel RCH, the number of the repair channel RCH included in the data driver 150*c* is not limited to the example in FIGS. 10 through 12B.

Figure 13:
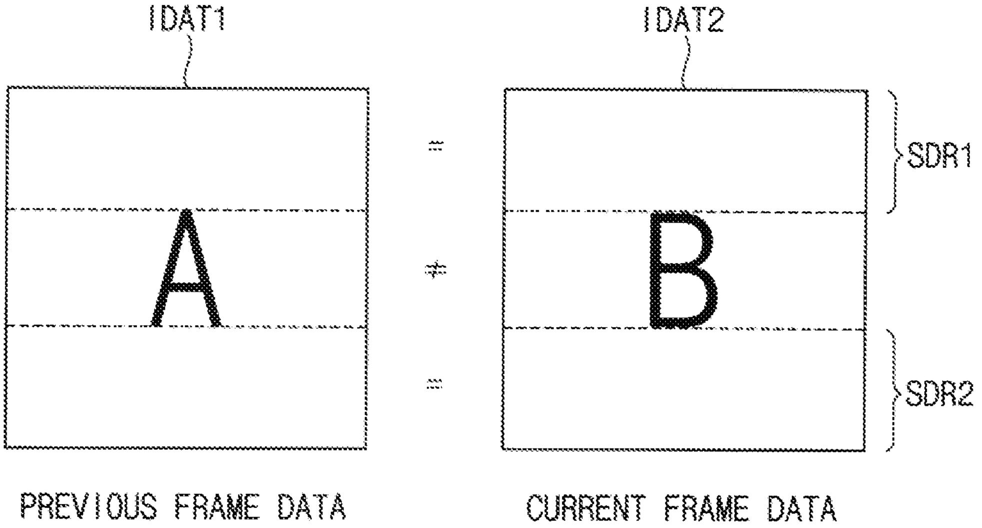
FIG. 13 is a diagram for describing an example where a same data region is detected in a display device according to embodiments of the present inventive concept.
Figure 14:
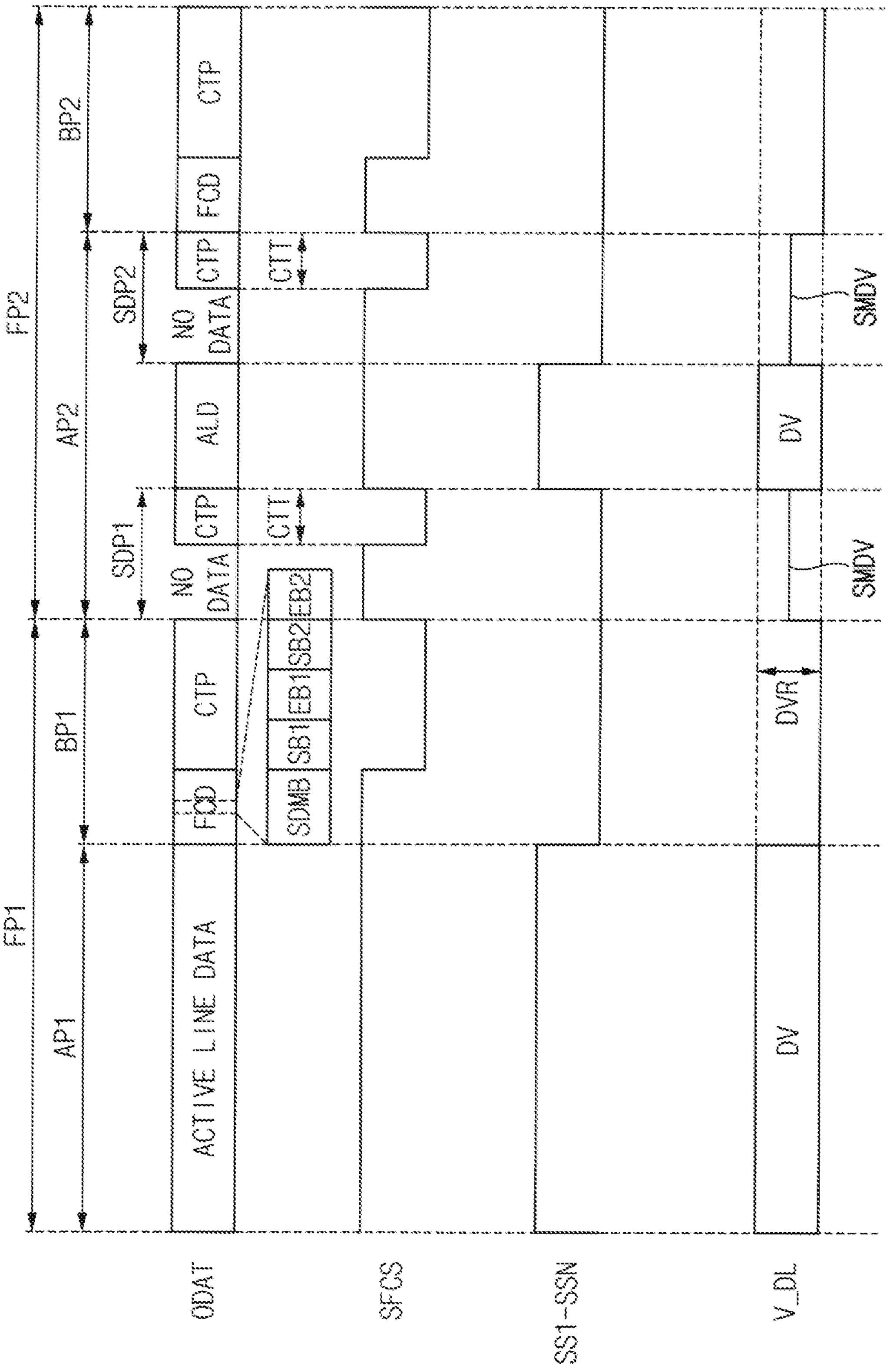
FIG. 14 is a timing diagram for describing an example of an operation of a display device according to embodiments of the present inventive concept.
Figure 15:
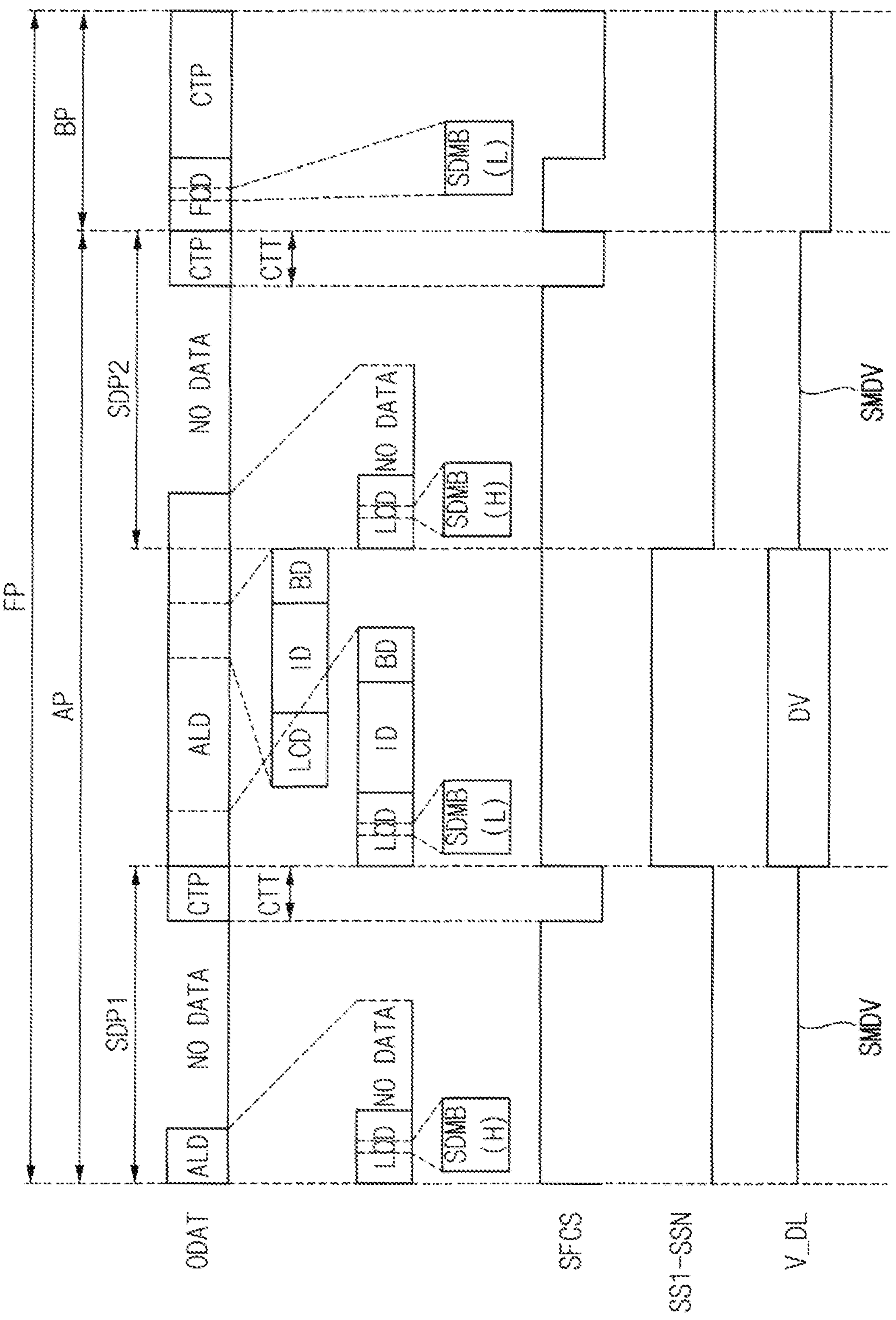
FIG. 15 is a timing diagram for describing another example of an operation of a display device according to embodiments of the present inventive concept.

FIG. 13 is a diagram for describing an example where a same data region is detected in a display device according to embodiments of the present inventive concept, FIG. 14 is a timing diagram for describing an example of an operation of a display device according to embodiments of the present inventive concept, and FIG. 15 is a timing diagram for describing another example of an operation of a display device according to embodiments of the present inventive concept.

Referring to FIGS. 1 and 13, a controller 170 of a display device 100 may detect one or more regions of a display panel 110 each including one or more pixel rows as a same data region SDR1 and SDR2. For example, the controller 170 may compare first input image data IDAT1 in a previous frame period and second input image data IDAT2 in a current frame period. As a result of the comparison, in a case where the second input image data IDAT2 for a first region of the display panel 110 are substantially the same as the first input image data IDAT1 for the first region of the display panel 110, and the second input image data IDAT2 for a second region of the display panel 110 are substantially the same as the first input image data IDAT1 for the second region of the display panel 110, the controller 170 may detect the first region and the second region of the display panel 110 as a first same data region SDR1 and a second same data region SDR2, respectively. In some embodiments, each of the first and second same data regions SDR1 and SDR2 may be a region of the display panel 110 including one or more pixel rows. In addition, more than two same data regions may be detected by the controller 170 of the display device 100. For example, in reference to FIG. 13, regions to the left and right of the letters A and B between the first and second same data regions SDR1 and SDR2 may correspond to third and fourth same data regions.

Hereinafter, an example of an operation of the display device 100 according to embodiments will be described below with reference to FIGS. 1, 13 and 14.

FIG. 14 illustrates an example where the first and second same data regions SDR1 and SDR2 are detected, and a second frame period FP2 includes a first same data period SDP1 allocated to the first same data region SDR1 and a second same data period SDP2 allocated to the second same data region SDR2. An operation of the display device 100 in a first frame period FP1 may be substantially the same as an operation of the display device 100 described above with reference to FIG. 4. However, as illustrated in FIG. 14, frame configuration data FCD transferred through a data transfer line DTL in a first blank period BP1 of the first frame period FP1 may include not only a shut down mode bit SDMB, but also at least one set of same data region start bits SB1 and SB2 and same data region end bits EB1 and EB2 representing at least one same data region SDR1 and SDR2.

For example, the frame configuration data FCD may include the shut down mode bit SDMB representing whether a data driver 150 operates in a shut down mode in the first and second same data periods SDP1 and SDP2 of a second frame period FP2, first same data region start bits SB1 indicating a first pixel row of the first same data region SDR1; first same data region end bits EB1 indicating a last pixel row of the first same data region SDR1, second same data region start bits SB2 indicating a first pixel row of the second same data region SDR2; and second same data region end bits EB2 indicating a last pixel row of the second same data region SDR2. In the case there is an additional same data region, the frame configuration data FCD may further include third same data region start bits SB3 indicating a first pixel row of a same data region; and third same data region end bits indicating a last pixel row of the third same data region, for example.

In a second active period AP2 of the second frame period FP2, the controller 170 may transfer output image data ODAT, or active line data ALD for a region of the display panel 110 other than the first and second same data regions SDR1 and SDR2 to the data driver 150, and may not transfer the output image data ODAT for the first and second same data regions SDR1 and SDR2 to the data driver 150. Further, in the second active period AP2, a scan driver 130 may provide scan signals SS1-SSN to the region of the display panel 110 other than the first and second same data regions SDR1 and SDR2, and may not provide the scan signals SS1-SSN to the first and second same data regions SDR1 and SDR2. Accordingly, pixels PX in the region of the display panel 110 other than the first and second same data regions SDR1 and SDR2 may receive data voltages DV, but pixels PX in the first and second same data regions SDR1 and SDR2 may maintain data voltages DV in the first frame period FP1.

In the first and second same data periods SDP1 and SDP2, at least a portion of components (e.g., a TX block 180) of the controller 170 and/or at least a portion of components (e.g., a RX block 160 and/or an analog block 250) of the data driver 150 may be off. Accordingly, in the first and second same data periods SDP1 and SDP2, power consumption of the data driver 150 and the display device 100 may be reduced. Further, in the first and second same data periods SDP1 and SDP2, the data driver 150 may apply a shut down mode data voltage SMDV to data lines of the display panel 110. Accordingly, power consumption for charging or discharging the data lines may be reduced, and hysteresis characteristics of driving transistors of the pixels PX may be improved.

In some embodiments, as illustrated in FIG. 14, during a predetermined period CTT before an end time point of each of the first and second same data periods SDP1 and SDP2, the controller 170 may transfer a clock training pattern CTP to the data driver 150 through the data transfer line DTL. Further, while the clock training pattern CTP is transferred, the controller 170 may transfer a forward signal SFCS having a low level to the data driver 150. In this case, a CDR circuit of the RX block 160 of the data driver 150 may perform a clock training operation during the predetermined period CTT. By the clock training operation during the predetermined period CTT, a clock signal and data after each of the first and second same data periods SDP1 and SDP2 may be normally recovered.

Hereinafter, another example of an operation of the display device 100 according to embodiments will be described below with reference to FIGS. 1, 13 and 15.

FIG. 15 illustrates an example where the first and second same data regions SDR1 and SDR2 are detected, and a frame period FP includes a first same data period SDP1 allocated to the first same data region SDR1 and a second same data period SDP2 allocated to the second same data region SDR2. The controller 170 may transfer active line data ALD for each pixel row of the display panel 100 through the data transfer line DTL in an active period AP of each frame period FP. The active line data ALD may include line configuration data LCD, image data ID for a corresponding pixel row and a horizontal blank data BD. In some embodiments, the line configuration data LCD may be referred to as a line protocol. The controller 170 may inform the data driver 150 of each of the first and second same data periods SDP1 and SDP2 of the shut down mode by using the line configuration data LCD of the active line data ALD.

For example, as illustrated in FIG. 15, in each of the first and second same data periods SDP1 and SDP2, the controller 170 may transfer the active line data ALD for a first pixel row of each of the first and second same data regions SDR1 and SDR2, and the active line data ALD for the first pixel row may include the line configuration data LCD including a shut down mode bit SDMB having a first value (e.g., a high level H) indicating that the data driver 150 operates in the shut down mode. The data driver 150 may operate in the shut down mode in response to the shut down mode bit SDMB having the first value. Further, in each of the first and second same data periods SDP1 and SDP2, at least a portion of components of the data driver 150 may be off. Further, the controller 170 may not transfer the image data ID and the blank data BD of the active line data ALD for the first pixel row, and may not transfer the active line data ALD for subsequent pixel rows in each of the first and second same data region SDR1 and SDR2. Further, during a predetermined period CTT before an end time point of each of the first and second same data periods SDP1 and SDP2, the controller 170 may transfer a clock training pattern CTP to the data driver 150 through the data transfer line DTL.

If each of the first and second same data periods SDP1 and SDP2 ends, the controller 170 may transfer the active line data ALD for a pixel row next to a last pixel row of each of the first and second same data regions SDR1 and SDR2, and the active line data ALD for the pixel row next to the last pixel row may include the line configuration data LCD including a shut down mode bit SDMB having a second value (e.g., a low level L) indicating that the data driver 150 operates in a normal driving mode. The data driver 150 may operate in the normal driving mode in response to the shut down mode bit SDMB having the second value. Thus, the data driver 150 may provide data voltages DV to the pixel row based on the image data ID of the active line data ALD. Alternatively, in a case where the last pixel row of each of the first and second same data regions SDR1 and SDR2 is a last pixel row of the display panel 110, the frame configuration data FCD may include the shut down mode bit SDMB having the second value, or the line configuration data LCD of the active line data ALD for a first pixel row of the display panel 110 may include the shut down mode bit SDMB having the second value.

As described above, in the display device 100 according to embodiments, the controller 170 may detect a region of the display panel 110 including at least one pixel row as the first and second same data regions SDR1 and SDR2, and may not transfer the output image data ODAT for the first and second same data regions SDR1 and SDR2 to the data driver 150. Further, in the first and second same data periods SDP1 and SDP2 allocated to the first and second same data regions SDR1 and SDR2, at least a portion of components (e.g., the TX block 180) of the controller 170 and/or at least a portion of components (e.g., the RX block 160 and/or the analog block 250) of the data driver 150 may be off. Accordingly, the power consumption of the data driver 150 and the display device 100 may be reduced or minimized.

Figure 16:
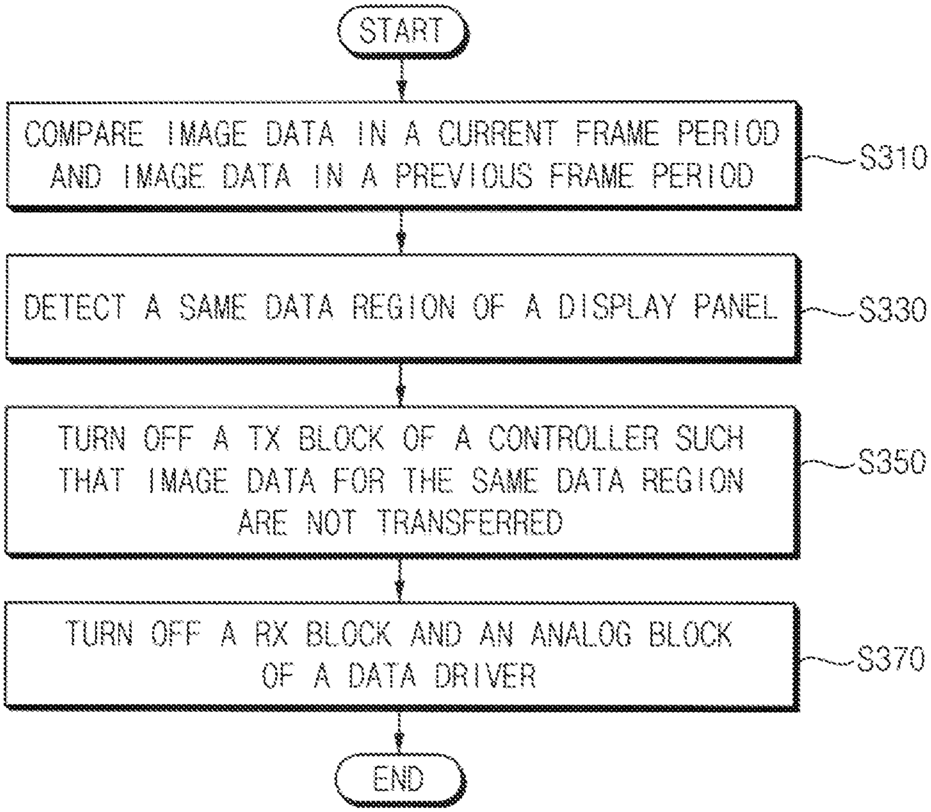
FIG. 16 is a flowchart illustrating a method of operating a display device according to embodiments of the present inventive concept.

FIG. 16 is a flowchart illustrating a method of operating a display device according to embodiments of the present inventive concept.

Referring to FIG. 16, a controller of a display device may compare image data in a current frame period and the image data in a previous frame period (S310). The controller may detect a same data region of a display panel of the display device where the image data in the current frame period are substantially the same as the image data in the previous frame period (S330).

If the same data region is detected, a TX block of the controller may be turned (or powered) off such that the image data for the same data region are not transferred to a data driver of the display device in the current frame period (S350). Thus, in a same data period allocated to the same data region, the TX block of the controller may be off. Further, in the same data period allocated to the same data region, at least one of a RX block and an analog block of the data driver may be turned (or powered) off (S370). Accordingly, in the method of operating the display device according to embodiments, power consumption of the data driver and the display device may be reduced or minimized.

Figure 17:
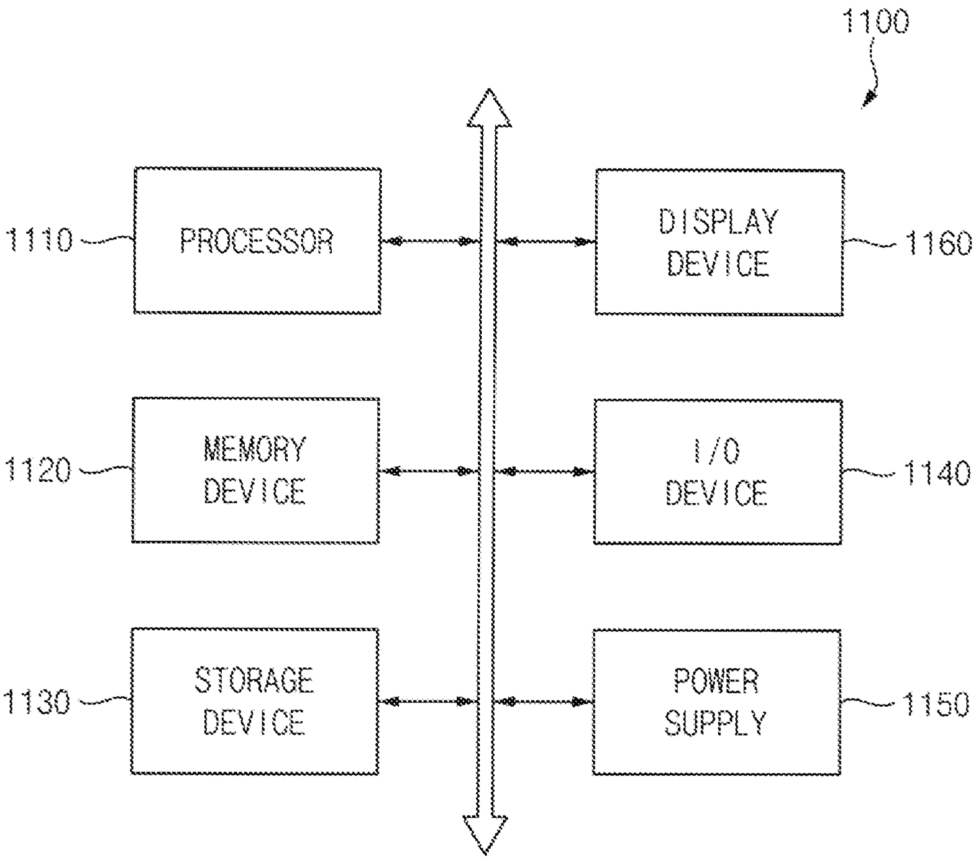
FIG. 17 is a block diagram illustrating an electronic device including a display device according to embodiments of the present inventive concept.

FIG. 17 is a block diagram illustrating an electronic device including a display device according to embodiments.

Referring to FIG. 17, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a compact disk-read only memory (CD-ROM) device, etc. The I/O device 1140 may be an input device such as a keyboard, a keypad, a mouse, a touch screen, etc, and an output device such as a printer, a speaker, etc. The power supply 1150 may supply power for operations of the electronic device 1100. The display device 1160 may be coupled to other components via the buses or other communication links.

In the display device 1160, a controller may detect a same data region of a display panel, and may not transfer image data for the same data region to a data driver. In some embodiments, in a same data period allocated to the same data region, at least a portion of components (e.g., a receiving block and/or an analog block) of the data driver may be turned off. Accordingly, power consumption of the data driver and the display device 1160 may be reduced or minimized.

According to embodiments, the electronic device 1100 may be any electronic device including the display device 1160, such as a digital television, a three dimensional (3D) television, a personal computer (PC), a home appliance, a laptop computer, a cellular phone, a smart phone, a tablet computer, a wearable device, a personal digital assistant (PDA), a portable multimedia player (PMP), a digital camera, a music player, a portable game console, a navigation system, etc.

The foregoing is illustrative of embodiments of the present inventive concept and is not to be construed as limiting thereof. Although a few embodiments have been described, those skilled in the art will readily appreciate that many modifications are possible in the embodiments without departing from the scope of the present inventive concept. Accordingly, all such modifications are intended to be included within the scope of the present inventive concept as set forth in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. An electronic device comprising:

a processor configured to provide input image data; and a display device configured to receive the input image data from the processor, and to display an image based on the input image data, the display device comprising:

a display panel including a plurality of pixels;

a data driver configured to provide data voltages to the plurality of pixels;

a controller configured to control the data driver, to detect a same data region of the display panel when first image data in a current frame period is at least partially the same as second image data in a previous frame period, and not to transfer the first image data to the data driver in a same data period corresponding to the same data region within the current frame period;

a differential signal line including a first line and a second line located between the controller and the data driver, and configured to transfer the first and second image data;

a switch coupled between the first line and the second line; and a termination resistor coupled in series with the switch between the first line and the second line, wherein, in the same data period corresponding to the same data region within the current frame period, a receiving block of the data driver controls the switch to be turned off.

2. The electronic device of claim 1, wherein, in the same data period corresponding to the same data region within the current frame period, at least a portion of components of the data driver is turned off.

3. The electronic device of claim 2, wherein, in the same data period, the receiving block or an analog block of the data driver is turned off.

4. The electronic device of claim 1, wherein, during a predetermined period before an end time point of the same data period, the controller transfers a clock training pattern to the data driver.

5. The electronic device of claim 1, wherein storage capacitors of the plurality of pixels in the same data region do not receive the data voltages from the data driver in the current frame period, and wherein the plurality of pixels in the same data region emits light in the current frame period based on the data voltages that are stored in the storage capacitors in the previous frame period.

6. The electronic device of claim 1, wherein, in the same data period corresponding to the same data region within the current frame period, the data driver applies a shut down mode data voltage to a plurality of data lines of the display panel, and the shut down mode data voltage is not transferred to storage capacitors of the plurality of pixels in the same data region.

7. The electronic device of claim 1, wherein the data driver includes:

a plurality of output buffers coupled to a plurality of data lines of the display panel; and a plurality of switches located between output terminals of the plurality of output buffers, and wherein, in the same data period corresponding to the same data region within the current frame period, the plurality of switches is turned on to couple the output terminals of the plurality of output buffers to each other, a first portion of the plurality of output buffers applies a shut down mode data voltage to the plurality of data lines, and a second portion of the plurality of output buffers is turned off.

8. The electronic device of claim 1, wherein the data driver includes:

a plurality of output buffers coupled to a plurality of data lines of the display panel;

at least one additional output buffer; and a plurality of switches located between output terminals of the plurality of output buffers and an output terminal of the additional output buffer, and wherein, in the same data period corresponding to the same data region within the current frame period, the plurality of switches is turned on to couple the output terminals of the plurality of output buffers and the output terminal of the additional output buffer, the additional output buffer applies a shut down mode data voltage to the plurality of data lines, and the plurality of output buffers is turned off.

9. The electronic device of claim 1, wherein the data driver includes:

a plurality of output buffers coupled to a plurality of data lines of the display panel;

at least one repair output buffer; and a plurality of switches located between output terminals of the plurality of output buffers and an output terminal of the repair output buffer, and wherein, in the same data period corresponding to the same data region within the current frame period, the plurality of switches is turned on to couple the output terminals of the plurality of output buffers and the output terminal of the repair output buffer, the repair output buffer applies a shut down mode data voltage to the plurality of data lines, and the plurality of output buffers is turned off.

10. The electronic device of claim 1, wherein the controller detects the same data region in each frame period.

11. The electronic device of claim 1, wherein the controller transfers frame configuration data to the data driver in a blank period of each frame period through a data transfer line, and wherein the frame configuration data includes a shut down mode bit representing whether the data driver operates in a shut down mode.

12. The electronic device of claim 1, wherein the controller detects a region of the display panel including at least one pixel row as the same data region.

13. The electronic device of claim 1, wherein the controller transfers frame configuration data to the data driver in a blank period of each frame period through a data transfer line, and wherein the frame configuration data includes:

a shut down mode bit representing whether the data driver operates in a shut down mode in the same data period corresponding to the same data region;

same data region start bits indicating a first pixel row of the same data region; and same data region end bits indicating a last pixel row of the same data region.

14. The electronic device of claim 1, wherein the controller transfers active line data for each pixel row of the display panel in an active period of each frame period through a data transfer line, and the active line data includes line configuration data, wherein the line configuration data for a first pixel row of the same data region includes a shut down mode bit having a first value indicating that the data driver operates in a shut down mode, and wherein the line configuration data for a pixel row next to a last pixel row of the same data region includes a shut down mode bit having a second value indicating that the data driver operates in a normal driving mode.

15. The electronic device of claim 1, further comprising:

a scan driver configured to provide scan signals to the plurality of pixels, wherein the scan driver does not provide the scan signals to the same data region in the current frame period.

16. The electronic device of claim 1, wherein each of the plurality of pixels includes at least one n-type metal oxide semiconductor (NMOS) transistor.

17. An electronic device comprising:

a processor configured to provide input image data; and a display device configured to receive the input image data from the processor, and to display an image based on the input image data, the display device comprising:

a display panel including a plurality of pixels;

a data driver configured to provide data voltages to the plurality of pixels; and a controller configured to control the data driver, to detect a same data region of the display panel when first image data in a current frame period is at least partially the same as second image data in a previous frame period, and not to transfer the first image data to the data driver in a same data period corresponding to the same data region within the current frame period, wherein the data driver includes:

a plurality of output buffers coupled to a plurality of data lines of the display panel; and a plurality of switches located between output terminals of the plurality of output buffers, and wherein, in the same data period corresponding to the same data region within the current frame period, the plurality of switches is turned on to couple the output terminals of the plurality of output buffers to each other, a first portion of the plurality of output buffers applies a shut down mode data voltage to the plurality of data lines, and a second portion of the plurality of output buffers is turned off.

18. The electronic device of claim 17, further comprising:

a differential signal line including a first line and a second line located between the controller and the data driver, and configured to transfer the first and second image data;

a switch coupled between the first line and the second line; and a termination resistor coupled in series with the switch between the first line and the second line, wherein, in the same data period corresponding to the same data region within the current frame period, a receiving block of the data driver controls the switch to be turned off.

19. The electronic device of claim 17, wherein, during a predetermined period before an end time point of the same data period, the controller transfers a clock training pattern to the data driver.

20. The electronic device of claim 17, wherein the controller transfers frame configuration data to the data driver in a blank period of each frame period through a data transfer line, and wherein the frame configuration data includes a shut down mode bit representing whether the data driver operates in a shut down mode.

* * * * *